US008350458B2

(12) United States Patent
Ohtomo et al.

(10) Patent No.: US 8,350,458 B2
(45) Date of Patent: Jan. 8, 2013

(54) DISPLAY PANEL AND IMAGE DISPLAY APPARATUS

(75) Inventors: Ryo Ohtomo, Chigasaki (JP); Toshimitsu Kawase, Ebina (JP); Kinya Kamiguchi, Kamakura (JP); Takeshi Yamamoto, Tokyo (JP); Tsukasa Abe, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 12/764,367

(22) Filed: Apr. 21, 2010

(65) Prior Publication Data
US 2010/0289401 A1  Nov. 18, 2010

(30) Foreign Application Priority Data

May 15, 2009 (JP) ................................ 2009-118970
Nov. 30, 2009 (JP) ................................ 2009-272574

(51) Int. Cl.
*H01J 1/88* (2006.01)
*H01J 63/04* (2006.01)
*H05K 7/00* (2006.01)

(52) U.S. Cl. ..................... 313/292; 313/495; 361/679.21
(58) Field of Classification Search .................. 313/292, 313/495; 361/679.21
See application file for complete search history.

(56) References Cited

U.S. PATENT DOCUMENTS

| 6,342,875 B2 | 1/2002 | Todokoro | |
|---|---|---|---|
| 6,831,619 B2 | 12/2004 | Todokoro | |
| 7,692,370 B2 | 4/2010 | Murata et al. | |
| 2001/0043170 A1 | 11/2001 | Todokoro | |
| 2001/0048600 A1* | 12/2001 | Oishi et al. | 362/294 |
| 2005/0264985 A1* | 12/2005 | Kim et al. | 361/681 |
| 2006/0098136 A1 | 5/2006 | Masunaga et al. | |
| 2006/0232208 A1 | 10/2006 | Moon et al. | |
| 2007/0108886 A1* | 5/2007 | Miyazaki et al. | 313/495 |
| 2007/0279326 A1 | 12/2007 | Jeong | |
| 2008/0117575 A1* | 5/2008 | Kang | 361/681 |
| 2008/0122339 A1 | 5/2008 | Murata et al. | |
| 2008/0223998 A1* | 9/2008 | Bang et al. | 248/176.1 |
| 2008/0239643 A1* | 10/2008 | Min et al. | 361/681 |

(Continued)

FOREIGN PATENT DOCUMENTS

EP  1655705 A1  5/2006

(Continued)

OTHER PUBLICATIONS

Communication dated Jun. 21, 2011, forwarding a European Search Report dated Jun. 10, 2011, in counterpart European Application No. 10162869.1-2208/2264735.

*Primary Examiner* — Anh T. Mai
*Assistant Examiner* — Michael Santonocito
(74) *Attorney, Agent, or Firm* — Fitzpatrick, Cella, Harper & Scinto

(57) ABSTRACT

A vacuum vessel includes a face plate, a rear plate having an interior surface that opposes the face plate, and a side wall joining the face plate and the rear plate, and a plurality of plate-like spacers provided between the face plate and the rear plate so that lengthwise directions thereof are parallel to each other. In addition, a plurality of linear fixing members are adhered to an exterior surface of the rear plate on the opposite side from the interior surface at mutually prescribed intervals and along the lengthwise direction of the plurality of spacers.

25 Claims, 12 Drawing Sheets

U.S. PATENT DOCUMENTS

| | | |
|---|---|---|
| 2008/0297443 A1 | 12/2008 | Arima et al. |
| 2009/0121096 A1 | 5/2009 | Nonaka |
| 2009/0224649 A1 | 9/2009 | Yamamoto |
| 2009/0225507 A1* | 9/2009 | Sato .................. 361/679.21 |
| 2011/0019351 A1* | 1/2011 | Bayne et al. ............ 361/679.01 |

FOREIGN PATENT DOCUMENTS

| | | |
|---|---|---|
| EP | 1833074 A1 | 9/2007 |
| JP | 10-326580 A | 8/1998 |
| JP | 2005-011764 A | 1/2005 |
| JP | 2006-185723 A | 7/2006 |
| WO | 2009/072691 A1 | 6/2009 |

* cited by examiner

DISPLAY PANEL

VERTICAL DIRECTION

HORIZONTAL DIRECTION

DISPLAY PANEL AND IMAGE DISPLAY APPARATUS

BACKGROUND OF THE INVENTION

1. Field of the Invention

The present invention relates to a display panel and an image display apparatus.

2. Description of the Related Art

Image display apparatuses such as a field emission display (FED) are known that are of a type in which electrons emitted from electron-emitting devices are radiated onto a light emitter such as a phosphor. Such image display apparatuses use a display panel provided with a flat, rectangular vacuum vessel in which the interior thereof is maintained at a pressure lower than atmospheric pressure (vacuum). In order to maintain the internal space in a vacuum, a plurality of spacers are typically provided within the flat, rectangular vacuum vessel In an image display apparatus having a display panel provided with a flat, rectangular vacuum vessel in this manner, it is required to prevent the vacuum vessel from being damaged by impact to the image display apparatus. In addition, it is also required to not only prevent damage to the exterior of the vacuum vessel, but also to prevent damage to members relating to the image display located within the vacuum vessel. Examples of impact that cause damage to the vacuum vessel include impact to the image display apparatus from the outside, impact occurring during transport or installation, and impact caused by dropping due to careless handling.

Japanese Patent Application Laid-open No. 2005-011764 discloses a reinforcement frame attached to the back (side on the opposite side from the display side) of a vacuum vessel that composes a display panel in order to improve the mechanical strength of the vacuum vessel. The reinforcement frame is disclosed to have a pair of first frame sections extending nearly parallel to the long side of a flat, rectangular vacuum vessel, and a pair of second frame sections extending nearly parallel to the short side of the vacuum vessel and coupled to the pair of first frame sections.

Japanese Patent Application Laid-open No. 2006-185723 discloses a vacuum vessel provided with long, narrow plate-like spacers arranged so that each of the lengthwise directions thereof are parallel. A mode is disclosed therein in which long, narrow plate-like spacers are contacted in a plurality of spacer contact layers intermittently provided on a metal back layer that covers a light-emitting surface. In addition, Japanese Patent Application Laid-open No. H10-326580 discloses the providing of a protective plate on a display surface of a vacuum vessel that composes a display panel.

It was conventionally necessary to increase the strength of vacuum vessels by providing a high-strength back supporting member in the manner of the reinforcement frame disclosed in Japanese Patent Application Laid-open No. 2005-011764 on the back of a vacuum vessel that composes a display panel. More specifically, in order to obtain adequate strength, the impact resistance (reinforcement strength) of the vacuum vessel was increased by increasing the thickness of the back supporting member. Consequently, this resulted in problems such as increased weight and cost of the image display apparatus. In addition, the presence of a large back supporting member limited the area in which a power supply and printed circuit boards such as a drive circuit could be mounted, thereby resulting in problems such as having an effect on the capacity to reduce the thickness of the image display apparatus.

SUMMARY OF THE INVENTION

The present invention provides a display panel capable of realizing reduced thickness, light weight and low costs without impairing reinforcement strength, and an image display apparatus that uses that display panel.

The present invention in its first aspect provides an image display apparatus that includes: a vacuum vessel provided with a face plate to which is adhered a front plate, a rear plate having a surface that opposes the face plate, and a plurality of plate-like spacers provided between the face plate and the rear plate so that the lengthwise directions thereof are parallel to each other; a plurality of linear fixing members adhered to a surface of the rear plate on the opposite side from the surface opposing the face plate; and a supporting member that supports the vacuum vessel by means of the fixing members, wherein each of the plurality of linear fixing members is adhered to the rear plate by bonding members at mutually prescribed intervals and along the lengthwise direction of the plurality of spacers.

The present invention in its second aspect provides a display panel that includes: a vacuum vessel provided with a face plate to which is adhered a front plate, a rear plate having a surface that opposes the face plate, and a plurality of plate-like spacers provided between the face plate and the rear plate so that the lengthwise directions thereof are parallel to each other; and a plurality of linear fixing members adhered to a surface of the rear plate on the opposite side from the surface opposing the face plate, wherein each of the plurality of linear fixing members is adhered to the rear plate by bonding members at mutually prescribed intervals and along the lengthwise direction of the plurality of spacers.

According to the present invention, a display panel and an image display apparatus can be provided that are capable of realizing reduced thickness, light weight and low costs.

Further features of the present invention will become apparent from the following description of exemplary embodiments with reference to the attached drawings.

DESCRIPTION OF THE EMBODIMENTS

Figure 6A:
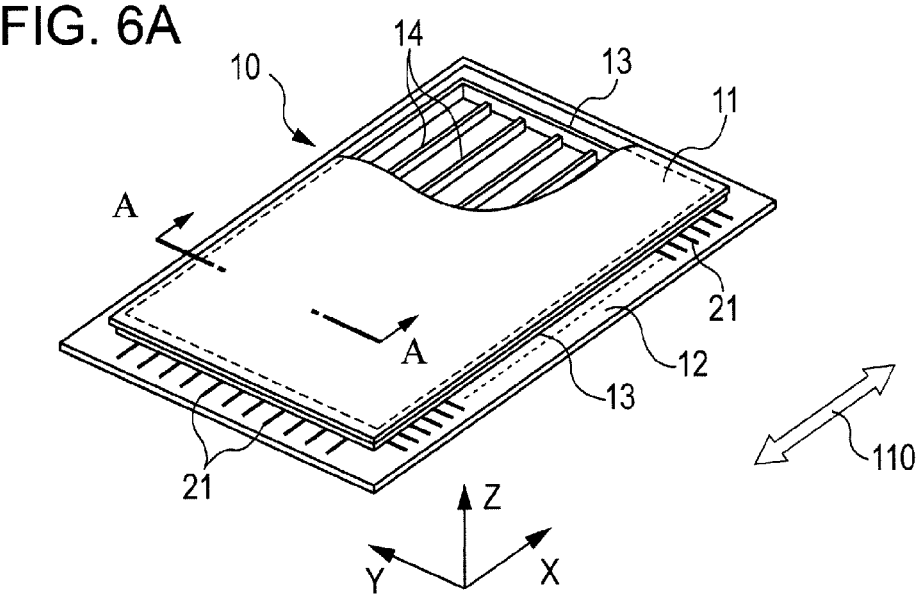
FIGS. 6A to 6C are schematic drawings of a display panel.

The following provides an explanation of embodiments of the present invention. The present invention is effective for use in a display panel provided with a flat, rectangular vacuum vessel 10 as shown in FIG. 6A, and an image display apparatus that uses that display panel. In particular, the present invention is effective for use in an image display apparatus and display panel that requires alleviation of deformation of the vacuum vessel 10 in a specific direction and alleviation of generation of stress in a specific direction during dropping impact and the like. The interior of the flat, rectangular vacuum vessel 10 is maintained at a pressure lower than atmospheric pressure, and has a plurality of long, narrow plate-like spacers 14 having for the lengthwise direction thereof the same direction as the lengthwise direction (first direction X) of the flat, rectangular vacuum vessel 10.

A display panel refers to a so-called display module, and is at least provided with the vacuum vessel 10, fixing members for fixing the vacuum vessel 10 to a supporting member, and bonding members that adhere the fixing members to the vacuum vessel. Moreover, the display panel is also typically provided with a drive circuit within the vacuum vessel for driving an electron-emitting device and an anode electrode. On the other hand, an image display apparatus refers to an apparatus that is at least provided with a supporting member for placing the display panel on an installation surface in addition to the display panel. Moreover, an image display apparatus also refers to an apparatus provided with a receiver for receiving television signals, an image processing circuit for carrying out a prescribed processing according to input image signals and characteristics of the display panel, and speakers and the like as necessary.

Figure 6B:
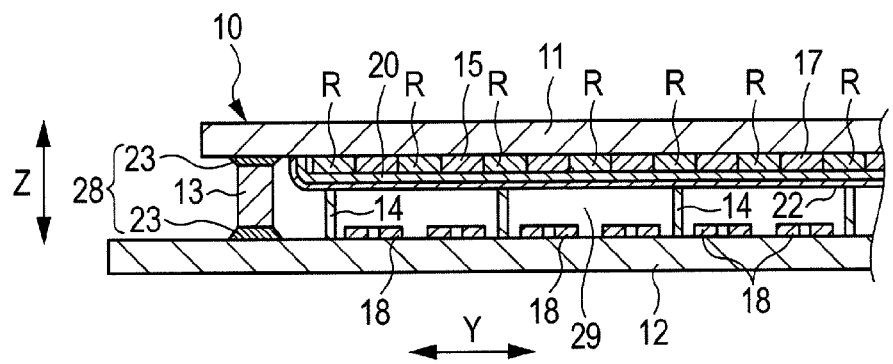
Figure 6C:
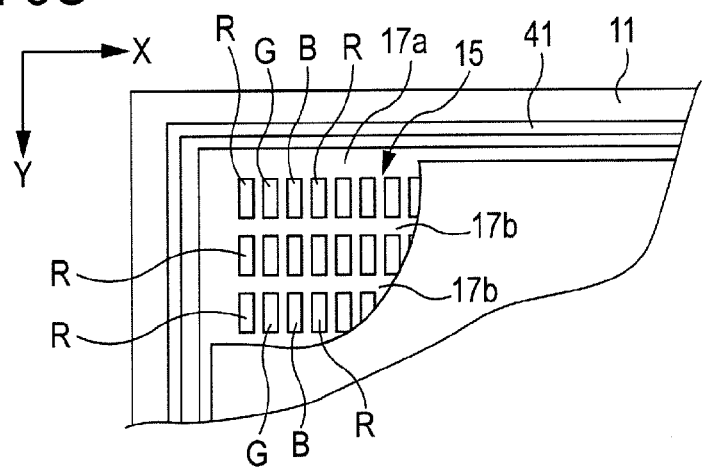

An explanation is first provided of a display panel to which the present invention is preferably applied using FIGS. 6A to 6C. FIG. 6A is a perspective view schematically showing a partial cutaway of the vacuum vessel 10 that composes the display panel, and FIG. 6B is a cross-sectional schematic drawing taken along line A-A of FIG. 6A. In addition, FIG. 6C is a schematic diagram of a portion of a face plate 11 when viewed from a rear plate 12. An example of such a display panel is a field emission display (FED). As shown in FIG. 6A, the vacuum vessel 10 is provided with the face plate 11 and the rear plate 12 respectively composed of rectangular plates, and these plates are arranged in mutual opposition with a gap of 1 to 2 mm there between. The thickness of the face plate 11 and the rear plate 12 is 0.5 to 3 mm and preferably 2 mm or less. The peripheral portions of the face plate 11 and the rear plate 12 are joined by means of a rectangular frame-shaped side wall 13, and the flat, rectangular vacuum vessel 10 is composed by maintaining a high vacuum of $10^{-4}$ Pa or less between the face plate 11 and the rear plate 12. Furthermore, a prescribed interval (space) is maintained between the face plate 11 and the rear plate 12. The size of that interval is, for example, 200 μm to 3 mm, and a more practical range thereof is 1 to 2 mm. The side wall 13 can be composed of, for example, glass or metal. In addition, an adhesive provided with a function for sealing low melting point glass or low melting point metal and the like can be used as bonding members 23. The bonding members 23 seal the peripheral portions of the face plate 11 and the rear plate 12 by adhering the side wall 13 to the face plate 11 and the rear plate 12, thereby joining these plates. Here, although the joining members are composed of the side wall 13 and the bonding members 23, the side wall 13 can also be omitted depending on the interval maintained between the face plate 11 and the rear plate 12. Namely, there are no limitations on the structure of the joining member provided it is able to join the face plate 11 and the rear plate 12 while also surrounding the space maintained between the face plate 11 and the rear plate 12 and maintaining the air tightness thereof.

As shown in FIG. 6B, a light emitter layer 15 such as a phosphor is provided on the inner surface of the face plate 11. This light emitter layer 15 has light emitters R, G and B that emit red, green and blue light, and a matrix-like light shields 17. A metal back layer 20, which has for the main component thereof, aluminum, for example, and functions as an anode electrode, is formed on the light emitter layer 15. Moreover, a getter film 22 maybe formed on the metal back layer 20. During a display operation, a prescribed anode voltage is applied to the metal back layer 20.

A large number of electron-emitting devices 18 that respectively emit an electron beam are provided on the surface of the rear plate 12 that opposes the face plate 11 (the inner surface) as electron sources that excite the R, G and B light emitters of the light emitter layer 15. These electron-emitting devices 18 are arranged in the form of a matrix corresponding to pixels (light emitters R, G and B). Furthermore, surface conduction electron-emitting devices or field emission electron-emitting devices can be applied for the electron-emitting devices 18. A large number of wires 21 that drive the electron-emitting devices 18 are provided in the form of a matrix on the inner surface of the rear plate 12, and the ends thereof are led outside the vacuum vessel 10.

A large number of long, narrow plate-like spacers 14 are arranged between the rear plate 12 and the face plate 11 in order to support atmospheric pressure that acts on these plates. In the case of defining the lengthwise direction (direction of the long side) of the face plate 11 and the rear plate 12 as a first direction X, and defining the direction perpendicular thereto (direction of width or direction of the short side) as a second direction Y, the plate-like spacers 14 extend in the first direction X. In other words, the lengthwise direction 110 of the plate-like spacers 14 is the first direction X. The large number of plate-like spacers 14 are arranged at a prescribed interval in the second direction Y. The interval in the second direction Y can be, for example, 1 to 50 mm. The spacers 14 can be composed of a long, narrow glass plates or ceramic plates. In addition, a high resistance film may be arranged on the surface of the plates or surface irregularities may be provided in the plates as necessary. The height of the spacers 14 (length in the Z direction) is several times to ten or more times the width thereof (length in the second direction Y), and the length thereof (length in the first direction X) is several tens of times to several hundreds of times the height.

In a display panel and image display apparatus provided with the above-mentioned vacuum vessel, in the case of display an image, an anode voltage is applied to the R, G and B emitter layers through the metal back layer 20. In addition, electron beams emitted from the electron-emitting devices 18 are simultaneously accelerated by the anode voltage and made to collide with the light emitters. As a result, the corresponding R, G and B light emitters are excited and emit light to display a color image.

As shown in FIG. 6C, the light emitter layer 15 has a large number of rectangular light emitters R, G and B that emit red, blue and green light. The light emitters R, G and B are mutually repeatedly arranged with a prescribed gap therebetween in the first direction X, and light emitters of the same color are arranged with a prescribed gap therebetween in the second direction Y. The gap in the first direction X is set to be smaller than the gap in the second direction Y. A light shielding layer 17 has a rectangular frame portion 17a that extends along the edge portion of the face plate 11, and matrix portions 17b that extend in the form of a matrix between the light emitter layers R, G and B inside the rectangular frame portion.

Figure 1:
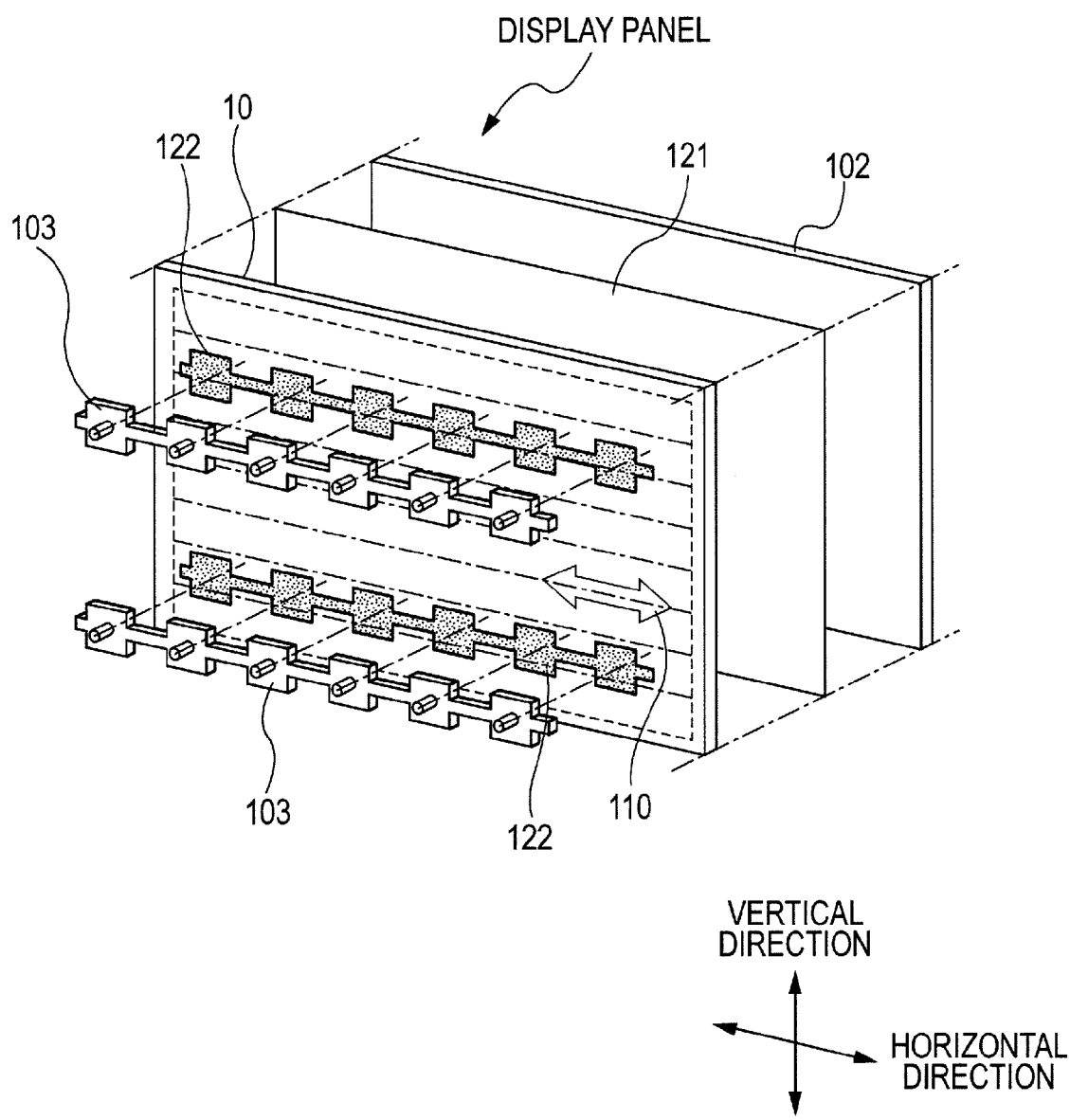
FIG. 1 is a drawing showing an example of an exploded view of a display panel of the present invention.
Figure 2A:
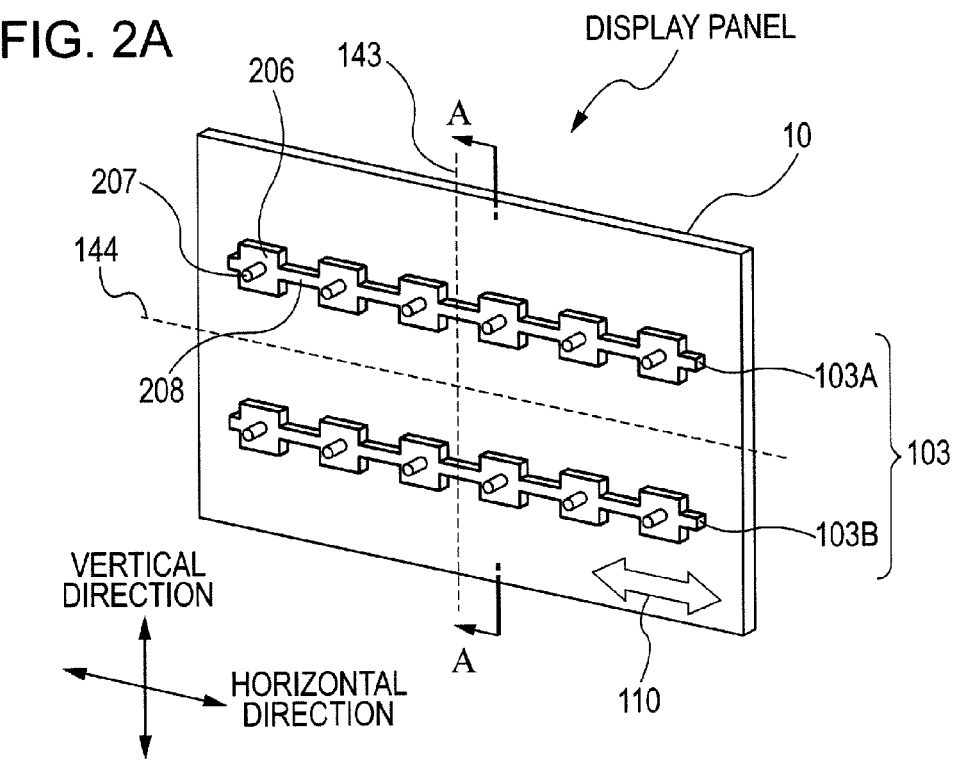
FIGS. 2A and 2B are drawings showing an example of the configuration of a display panel.
Figure 2B:
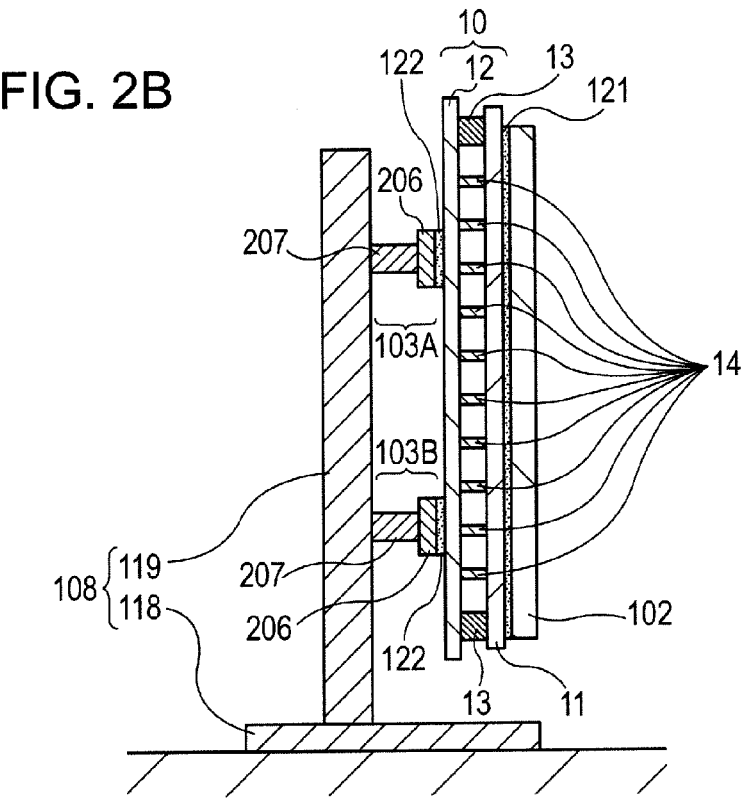

Next, an explanation is provided of the supporting structure of the image display apparatus using FIGS. 1 and 2. FIG. 1 is an example of an exploded view of a display panel when viewed from the back. Furthermore, although printed circuit boards for driving the display panel are normally provided on the back side of the display panel (opposite side from the image display surface) as shown in FIG. 1, the various types of printed circuit boards are omitted in order to facilitate explanation. FIG. 2A is a perspective view of the back side of a display panel. FIG. 2B is a cross-sectional schematic drawing of an image display apparatus that contains a cross-section taken along the line A-A of FIG. 2A in an image display apparatus in which a supporting member 108 is attached to the display panel of FIG. 2A. Furthermore, a cover such as an external panel (not shown) is typically attached in addition to the configuration shown in FIG. 2B in order to improve appearance in actual image display apparatuses.

A plurality of fixing members 103 for fixing the vacuum vessel 10 to the rigid body in the form of the supporting member 108 are adhered using bonding members 122 to the back of the rear plate 12 (surface on the opposite side from the side (inside) opposing the face plate 11). Since the fixing members 103 are firmly adhered (bonded) to the back of the vacuum vessel 10 in this manner, the vacuum vessel 10 can be supported with the supporting member 108 by means of the plurality of fixing members 103. Furthermore, the supporting member 108 can also be removably fixed to a display panel at least provided with the fixing members 103 and the bonding members 122 in addition to the vacuum vessel 10. In addition, the arrows 110 in FIGS. 1 and 2 represent the lengthwise direction of long, narrow, plate-like spacers 14 (spacer lengthwise direction) in the same manner as the arrow 110 shown in FIG. 6A. Namely, the lengthwise direction of the spacers in the examples of FIGS. 1 and 2A is the horizontal direction (width direction, lateral direction) of the image display apparatus.

In addition, the front plate 102 is adhered by a bonding member 121 to the surface of the front side of the face plate 11 of the vacuum vessel 10 (side on the opposite side from the side that opposes the rear plate 12). In the present embodiment, by arranging the lengthwise direction of the front plate 102, the lengthwise direction of the display panel 10 and the spacer lengthwise direction 110 to be parallel, deformation and concentration of stress in the spacer lengthwise direction 110 can be reduced. The front plate 102 is preferably in the form of a flat plate that is larger than the image display region (region or surface area in which the phosphors R, G and B are arranged) of the display panel (vacuum vessel 10). The front plate 102 is composed with a member that is transparent to visible light, and although a glass plate or polycarbonate plate, for example, can be used, a glass plate is particularly preferable from the viewpoint of optical characteristics. In order to give the vacuum vessel 10 a prescribed strength, the thickness of the front plate 102 is preferably 1.5 to 3.5 mm if it is composed of glass. In particular, the thickness of the front plate 102 is preferably set to be greater than the thicknesses of the face plate 11 and the rear plate 12 from the viewpoint of strength.

The material, shape, surface area and the like of the bonding member 121 is suitably set in consideration of the strength, impact absorption and thermal conductivity of the bonding member 121 and the flatness and the like of the front plate 102. Although there are no particular limitations on the bonding member 121, an adhesive that does not require high-temperature heating is preferably used to adhere the front plate 102 to the vacuum vessel 10 after forming the vacuum vessel 10. For example, a UV-curable resin adhesive can be used that is capable of adhering the front plate 102 composed of glass to the vacuum vessel 10 composed of glass at normal temperatures by irradiating with ultraviolet light. More specifically, an acrylic-based UV-curable resin adhesive can be used. Rigidity of the vacuum vessel 10, and particularly torsional rigidity in the planar direction, are increased by adhering the front plate 102 to the vacuum vessel 10 with the adhesive member 121. As a result, the thickness and weight of a conventionally required reinforcing member such as a reinforcing frame provided on the back of the rear plate 12 can be reduced considerably.

The plurality of fixing members 103 for fixing the display panel (the vacuum vessel 10) to the rigid body in the form of the supporting member 108 are composed of two, mutually separated linear fixing members (103A and 103B) in the example shown in FIGS. 1 and 2. Each of the linear fixing members (103A and 103B) is arranged so that the lengthwise direction thereof is parallel to the lengthwise direction 110 of the plate-like spacers. As a result, deformation of the spacers 14 and concentration of stress in those portions where the spacers 14 contact the face plate 11 (to be subsequently described in detail) can be reduced.

The plurality of the fixing members 103 are arranged so that one of the fixing members 103A satisfies a linear symmetrical relationship with respect to the other fixing member 103B by having the center line 144 in the horizontal direction (first direction X of FIG. 6A) of the image display region (or rear plate 12) as the axis of symmetry thereof. At the same time, each of the fixing members is arranged so as to satisfy a linear symmetrical relationship by having the center line 143 in the vertical direction (second direction Y of FIG. 6A) of the image display region (or rear plate 12) as the axis of symmetry thereof. This relationship can also be said to be a relationship such that the image display region can be folded back in the vertical direction at the center line 143. Furthermore, although an example in which two fixing members (103A and 103B) are used is explained here, the number of the fixing members 103 is two or more. In the case of using an odd number of fixing members (such as three), one of the fixing members is adhered on the rear plate 12 so as to be located on the center line 144 in the horizontal direction of the image display region of the vacuum vessel 10, for example. The remaining fixing members are then arranged away from the fixing member provided on the center line 144 by being adhered on the rear plate 12 so as to satisfy the above-mentioned two relationships.

Double-sided adhesive tape or adhesive and the like (bonding means) can be used for the bonding members 122. The material, shape, thickness, surface area and the like of the bonding members 122 are suitably set in consideration of the strength, shock absorption and thermal conductivity of the bonding members 122 and flatness of the supporting member and so forth. The bonding members 122 are preferably provided on the surface of the vacuum vessel 10 in the same shape as the fixing members. Namely, the lengthwise direction of the bonding members 122 is preferably arranged so as to be parallel to the lengthwise direction 110 of the plate-like spacers. As a result of this as well, deformation and stress concentration of the spacers can be reduced. Furthermore, although the width of the bonding members 122 can be set arbitrarily, in order to ensure an adequate bonding surface area between the fixing members and the vacuum vessel 10, the bonding members 122 preferably have the same shape as images of the fixing members 103 orthogonally projected onto the surface of the vacuum vessel 10 (surface of the rear plate 12) as shown in FIG. 1.

Each fixing member (103A and 103B) is provided with a plate-shaped member 206 and a protruding portion 207 provided on the plate-shaped member 206, and the protruding portion 207 is given the function of a supporting point. The protruding portions 207 are provided on the side on the opposite side from the side of the plate-like members 206 that adheres to the rear plate 12. As a result of employing this configuration, the rigid body in the form of the supporting member 108 is fixed to the plurality of the fixing members 103, and the display panel (vacuum vessel 10) is fixed to the supporting member 108. The plate-like members 206 and the protruding portions 207 are firmly connected, and the connecting method may be a method such as caulking, press-fitting, welding or adhesion. The width and/or surface area of the plate-like members 206 is set to be larger than the width and/or surface area of the base portions of the protruding portions 207 (portions fixed to the plate-like members 206) at least at those portions where the protruding portions 207 are provided (directly beneath the protruding portions 207). This is to reduce stress generated in the vacuum vessel when an impact is applied to the vacuum vessel 10 through the protruding portions 207.

The plate-like members 206 and the protruding portions 207 are preferably formed from a metal such as aluminum, iron or magnesium. The advantages of forming the plate-like members 206 and the protruding portions 207 from metal are as follows:

- the plate-like members 206 and the protruding portions 207 can be used as members that define ground for electrical circuits and the display panel;
- superior flame resistance; and,
- metal has superior strength.

In addition, favorable flatness can be obtained inexpensively by forming the plate-like members 206 by press-forming. The protruding portions 207 are able to function as interval-defining members, and the shape of the protruding portions 207 may be of any shape such as a cylindrical column, tetragonal column or polygonal column. A method such as header processing or machining can be used to fabricate the protruding portions 207. In addition, a structure can be provided in which thread cutting is carried out to give the protruding portions 207 the function of supporting points, and the fixing members (103A and 103B) firmly adhered to the vacuum vessel 10 are fixed to the supporting member 108 with screws. Although each fixing member (103A and 103B) is provided with six protruding portions 207, it is not necessary to use all of the protruding portions 207 for fixing to the supporting member 108. The numbers and locations of the protruding portions 207 used for fixing to the supporting member 108 can be suitably selected according to the shape and structure of the supporting member 108. For example, in the case of a supporting member 108 having a width in the horizontal direction that is equal to roughly half the width of the display panel, the two central protruding portions 207 among the six protruding portions 207 may be fixed to the supporting member 108. The greater the width in the horizontal direction of the supporting member 108 (support column 119), the greater the number of the protruding portions 207 or protruding portions 207 to the outside in the horizontal direction can be used for fixing. In addition, in the case of a supporting member 108 having a plurality of support columns 119, the protruding portions 207 can also be fixed to each of the support columns 119. In addition, caulking or press-fitting can be carried out at several locations at once by carrying out press-forming of the plate-like members 206 and the protruding portions 207 in combination. As a result, production cost of the fixing members can be reduced since the number of steps required for production can be decreased.

The supporting member 108 is provided with a support stand (pedestal) 118 for placing the display panel on an installation surface such as a desk or audio rack on which the image display apparatus is installed, and the support column 119 provided upright on the support stand 118 for holding the display screen of the display panel vertical with respect to the installation surface. Namely, the base portion of the support column 119 is fixed by the support stand 118. Furthermore, the pedestal 118 and the support column 119 can be connected with screws and the like so as to be removable. The supporting member 108 can be further provided with an angle adjustment portion so as to be able to adjust the angle of the display screen in all four directions relative to the support column 119. In addition, a rotating mechanism can be provided in the base portion of the support column 119 or in the pedestal 118 that allows rotation of the support column 119. In addition, although an example of composing the support stand 118 and the support column 119 with separate members is shown here, the support stand and the support column can also be in the form of a single member. In addition, a plurality of support columns 119 can also be provided.

Next, an explanation is provided of the configuration of the face plate 11 that contacts the spacers 14. A resistance adjustment layer 30 may be formed on the light shielding layer 17 shown in FIGS. 6B and 6C. The detailed configuration of the face plate 11 is schematically shown using FIG. 7. The resistance adjustment layer 30 is provided with a plurality of first resistance layers 31V, which extend in the second direction Y between light emitters respectively adjacent in the first direction X, and a plurality of second resistance adjustment layers 31H, which extend in the first direction X between light emitters respectively adjacent in the second direction Y, in the region of the matrix portions 17b of the light shielding layer 17. Since the light emitters are arranged in a row in the manner of R, G and B in the first direction X, the first resistance adjustment layers 31V have a narrower width than the second resistance adjustment layers 31H. For example, the width of the first resistance adjustment layers 31V is 40 µm, and the width of the second resistance adjustment layers 31H is 300 µm. Here, FIG. 7B is a cross-sectional view taken along line B-B of FIG. 7A, while FIG. 7C is a cross-sectional view taken along line C-C of FIG. 7A.

A thin film separation layer 32 is formed on the resistance adjustment layer 30. The thin film separation layer 32 has vertical line portions 33V formed on each of the first resistance adjustment layers 31V of the resistance adjustment layer 30, and horizontal line portions 33H formed on each of the second resistance adjustment layers 31H of the resistance adjustment layer 30. The thin film separation layer 32 is formed by containing a binder and particles dispersed at a suitable density so that the surface has surface irregularities, thereby separating a thin film (metal back) 20 subsequently formed by vapor deposition and the like. A phosphor or silica and the like can be used for the particles that compose the thin film separation layer 32. The thin film separation layer 32 is formed to be slightly thinner than the light shielding layer 17, and in terms of a numerical example, the width of the horizontal line portions 33H of the thin film separation layer 32 is 260 µm, while the width of the vertical line portions 33V is 20 µm.

After forming the thin film separation layer 32, smoothing is carried out using lacquer and the like to form a smooth metal back layer 20. The film for smoothing is burned away by baking after having formed the metal back layer 20.

Following smoothing, the metal back layer 20 is formed by vapor deposition or other thin film formation process. As a result, separated metal back layers 20a, which are two-dimensionally separated in the first direction X and the second direction Y, are formed by the thin film separation layer 32. The separated metal back layers 20a are located superposing each of the light emitters R, G and B. In this case, gaps between the separated metal back layers 20a are of nearly the same width as the widths of the horizontal line portions 33H and the vertical line portions 33V of the thin film separation layer 32, and are 20 μm in the first direction X and 260 μm in the second direction Y. Furthermore, the metal back layer 20 is omitted from FIG. 7A to avoid excessive complexity of the drawing.

A getter film 22 may also be formed superposing the metal back layer 20. In an FED, there are cases in which it is necessary to form the getter film 22 on a metal back layer in this manner to ensure the degree of vacuum over a long period of time. Since the action of the thin film separation layer is not lost after the metal back layer 20 is formed, the getter film 22 can be formed into separated getter films 22a that are two-dimensionally separated in a pattern similar to that of the metal back layer 20.

Figure 7A:
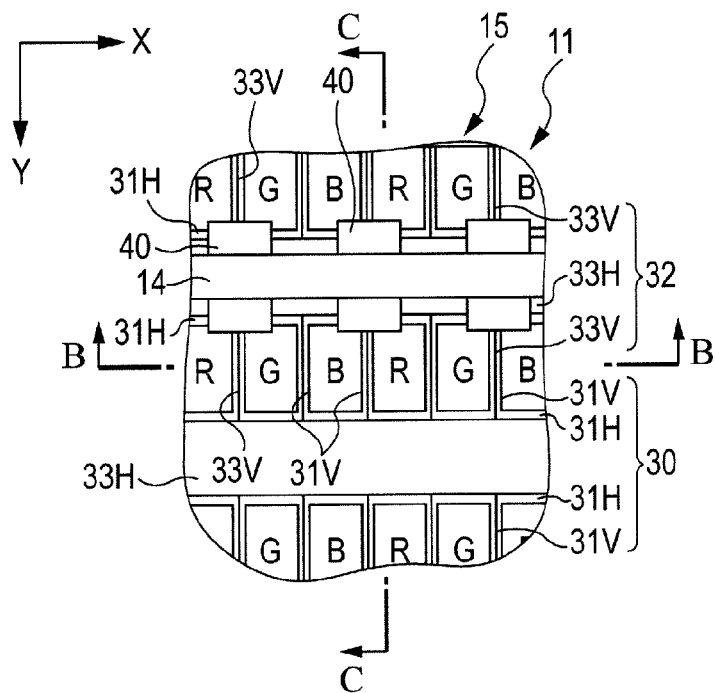
FIGS. 7A to 7C are schematic drawings of the face plate side of a display panel.
Figure 7B:
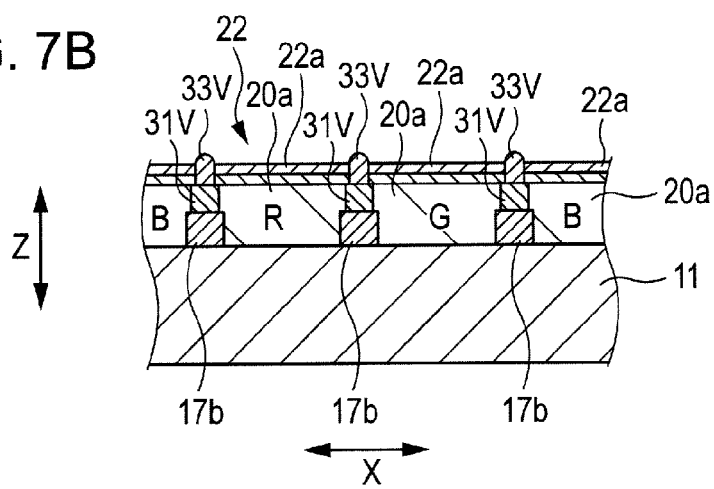
Figure 7C:
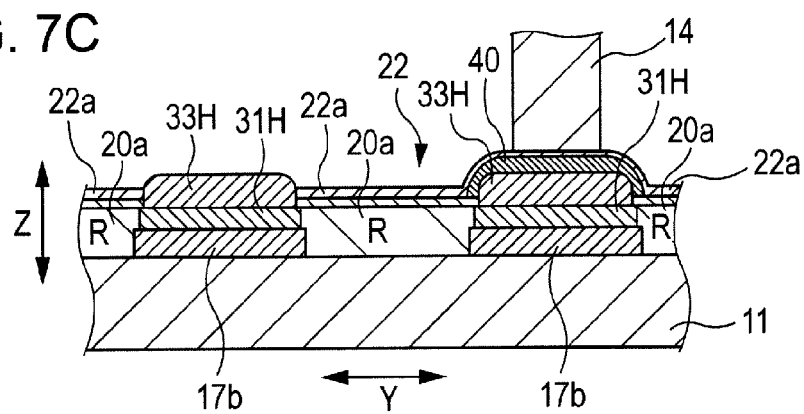

As shown in FIGS. 7A and 7C, each of the plurality of spacers 14 is arranged in opposition to the horizontal line portions 33H of the thin film separation layer 32. A spacer contact layer 40 is formed on each horizontal line portion 33H that opposes the spacers 14. Each spacer contact layer 40 is formed by, for example, printing a paste containing silver particles followed by baking. In addition to silver, conductive particles such as Pt or Au particles are also preferably applied. Since particles of an excessively small size cannot be formed in terms of printing accuracy, both end portions in the second direction Y of the spacer contact layers 40 slightly superpose four light emitter layers and separated metal back layers 20a, two of each of which are located on both sides of the horizontal line portions 33H in the second direction Y. In addition, the plurality of spacer contact layers 40 are intermittently provided at prescribed intervals in the first direction X as shown in FIG. 7A. The film thickness of the upper surface of the spacer contact layers 40 is adjusted so as to be thicker on the side of the rear plate 12 than the upper surface of the thin film separation layer 32. As a result, the spacers 14 are provided in contact with the spacer contact layers 40 without directly touching the thin film separation layer 32.

Although the spacer contact layers 40 are preferably electrically conductive from the viewpoints of contact with the spacers, preventing of charge accumulation and the like, the use of insulated spacer contact layers is also permitted. Furthermore, the thin film separation layer and resistance adjustment layer explained in the above-mentioned examples may be omitted depending on the form and fabrication method of the metal back 20. Alternatively, the spacer contact layers 40 may also not be provided in addition to the thin film separation layer and the resistance adjustment layer. In such cases, the spacers 14 contact the metal back 20 and the metal back serves as a spacer contact layer.

As was explained using FIG. 7, there are cases in which the spacers 14 contact the face plate 11 through the spacer contact layers 40. In such cases, there were cases in which damage was incurred by the image display apparatus due to impact to the image display apparatus from the outside, impact occurring during transport or installation, and impact caused by dropping the image display apparatus due to careless handling. More specifically, the vacuum vessel 10 undergoes deformation such as bending into the shape of protrusions or indentations in the Z direction. Incidental to this deformation, members such as the spacer contact layers 40 or metal back 20 on the face plate 11 that are located at those portions contacted by the spacers 14 were subjected to shear force by the long, narrow plate-like spacers 14 causing them to be crushed. When members (such as the spacer contact layers 40 and the metal back) on the face plate 11 contacted by the spacers 14 are crushed, the fragments thereof drop onto the side of the rear plate 12, resulting in the occurrence of an undesirable electrical discharge between the metal back and the electron-emitting devices and between the separated metal backs. As a result, the image display apparatus was no longer be able to function as an image display apparatus or displayed images deteriorated considerably.

However, in the display panel of the present embodiment, a front plate 102 is adhered to the surface of the face plate 11, and the fixing members 103 in the form of a plurality of lines are arranged so as to be parallel to the lengthwise direction 110 of the spacers. Consequently, even if various types of impact as previously described are applied to the vacuum vessel 10 through the plurality of fixing members 103 from the supporting member 108, deformation of the spacers 14 and shear stress generated in a portion that contacts the spacers 14 (spacer contact layer 40) can be reduced. In the display panel of the present embodiment, applied impacts are applied to the vacuum vessel 10 in the form of a plurality of lines that are parallel to the lengthwise direction of the spacers. For example, when an impact is applied through the plurality of fixing members 103, the surfaces of the plates (11 and 12) on the vacuum side deform into the shape of an irregular surface (or undergo sine wave-like deformation) in a cross-section of the vacuum vessel 10 taken along the vertical direction in FIGS. 1 and 2. However, in a cross-section of the vacuum vessel 10 taken along the horizontal direction in FIGS. 1 and 2, deformation of the vacuum vessel 10 (deformation of the face plate 11 and rear plate 12) can be greatly inhibited as compared with the cross-section taken along the vertical direction. In other words, in the cross-section of the vacuum vessel 10 taken along the horizontal direction, deformation of the plate-like spacers 14 in the manner of being bent into the shape of a bow (or undergoing sine wave-like deformation) can be inhibited. On the other hand, if the fixing members are provided along a direction perpendicular to the lengthwise direction of the spacers 14, the surfaces of the face plate 11 and the rear plate 12 deform into the shape of an irregular surface (or undergo sine wave-like deformation) in a cross-section of the vacuum vessel 10 taken along the vertical direction when an impact is applied. At the same time, the spacers are also subjected to force that deforms into the shape of an irregular surface (or deforms into the shape of a sine wave) in the cross-section of the vacuum vessel 10 taken along the horizontal direction. This phenomenon is due to the fixing members being present at intervals (cyclically present) in the cross-section of the display panel taken along the horizontal direction. Thus, when an impact is applied to the vacuum vessel 10 through the fixing members (and bonding members) from the supporting member 108, although the impact acts on those portions of the vacuum vessel 10 where the fixing members are adhered, the impact does not act on those portions where the fixing members are not adhered. As a result, portions where stress concentrate periodically occur in those portions where the spacers 14 contact the face plate 11 and the rear plate 12. At those portions where stress concentrates, there is increased susceptibility to the occurrence of spacer damage caused by the application of force that causes the spacers to bend, and as will be described later, damage to those portions contacted by the spacers (spacer contact portions) caused by the generation of shear stress at those spacer contact portions.

However, in the display panel explained in the present embodiment, since the fixing members 103 in the form of a plurality of lines are arranged in parallel to the lengthwise direction 110 of the spacers, the concentration of stress as described above can be inhibited. Consequently, the display panel is able to easily function as an image display as previously described as well as prevent prominent deterioration of display images.

In addition, the bonding members 122 are preferably in the form of lines and the lengthwise direction thereof and the lengthwise direction of the fixing members 103 in the form of lines are preferably parallel to the lengthwise direction 110 of the plate-like spacers 14. As a result of employing this type of configuration, since the bonding members 122 are present in a cross-section in the lengthwise direction 110 of the spacers 14, concentration of stress can be further reduced. Moreover, positioning the bonding members 122 and the fixing members 103 in the form of a plurality of lines directly behind the spacers 14 on with the rear plate 12 in between is even more preferable from the viewpoint of reducing stress.

In the example shown in FIGS. 1 and 2, each of the fixing members (103A and 103B) is provided with alternating and continuous wide portions 206 and narrow portions 208. Here, the width of the narrow portions or wide portions refers to the length in the second direction Y (direction perpendicular to the lengthwise direction 110 of the spacers). In addition, the reason for providing the protruding portions 207 on the wide portions 206 is that stress applied to the vacuum vessel 10 is reduced as a result of stress being dispersed in the wide portions 206 when an impact such as dropping has been applied to the vacuum vessel 10 through the protruding portions 207. The surface area, shape and thickness of these wide portions 206, namely the portions having a large surface area, are suitably determined according to the rigidity of the vacuum vessel 10, predicted falling impact force and the like. In addition, the pitch and quantity of the protruding portions 207 are also suitably determined according to the rigidity of the vacuum vessel 10, allowed dropping impact force and the like. The pitch (interval) of the protruding portions 207 in the second direction Y (direction perpendicular to the lengthwise direction 110 of the spacers) is set to be larger than the pitch (interval) of the protruding portions 207 in the first direction X (direction parallel to the lengthwise direction 110 of the spacers). In terms of practical use, the pitch of the protruding portions 207 in the first direction X is set to be less than one-half the pitch of the protruding portions 207 in the second direction Y. Furthermore, the pitch of the protruding portions 207 in the second direction Y can be considered to be the pitch (interval) of two adjacent fixing members 103 among the plurality of fixing members 103 adhered to the rear plate 12 (namely, can be considered to be the interval between the fixing members 103A and 103B in the example of FIG. 2). As a result of setting in this manner, since stress along the lengthwise direction 110 of the spacers 14 can be reduced and deformation of the vacuum vessel can be inhibited when an impact is applied to the vacuum vessel 10 through the protruding portions 207, damage to the vacuum vessel 10 can be inhibited. On the other hand, if the pitch (interval) of the protruding portions 207 in the second direction Y is set to be smaller than the pitch (interval) of the protruding portions 207 in the first direction X, stress along the lengthwise direction 110 of the spacers 14 cannot be reduced thereby making this undesirable. This case is similar to the case of providing the linear fixing members so that the lengthwise direction thereof is along a direction perpendicular to the lengthwise direction 110 of the spacers.

Figure 3A:
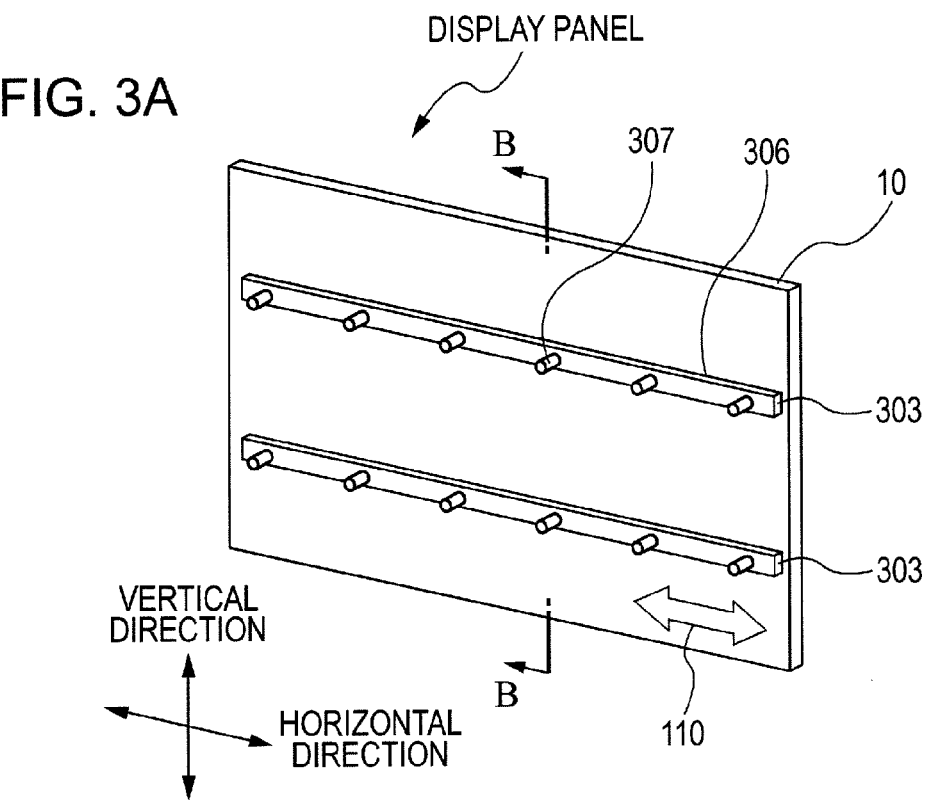
FIGS. 3A and 3B are drawings showing a first variation of fixing members.
Figure 3B:
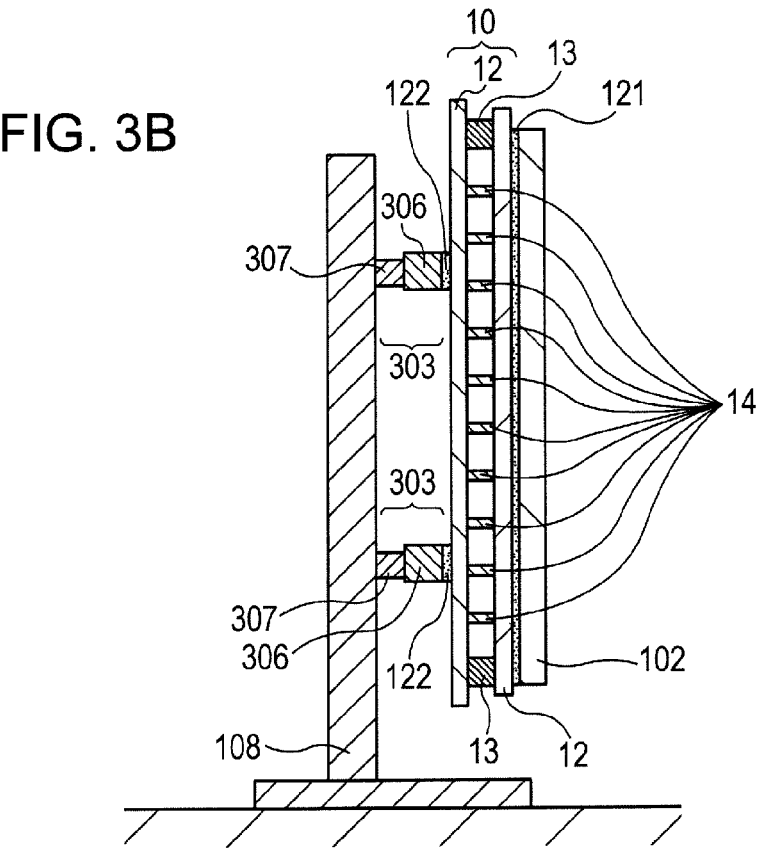

The following indicates variations of the fixing members 103 described above. In a first variation as shown in FIG. 3A, linear fixing members 303 can be composed of rod-like members 306 and protruding portions 307. FIG. 3A is a perspective view of the back side of a display panel. FIG. 3B is a cross-sectional schematic diagram of an image display apparatus using the vacuum vessel 10 of FIG. 3A in a cross-section corresponding to line B-B of FIG. 3A. Other aspects are the same as in the example explained using FIGS. 1 and 2. As a result of configuring in this manner, the range of molding methods that can be used for the fixing members 303 can be expanded, enabling them to be fabricated corresponding to the materials used. In addition, although the degree of freedom with respect to mounting printed circuit boards is inferior as compared with the example of FIGS. 1 and 2, design restrictions can be reduced as compared with the use of a conventional reinforcement frame.

Figure 4A:
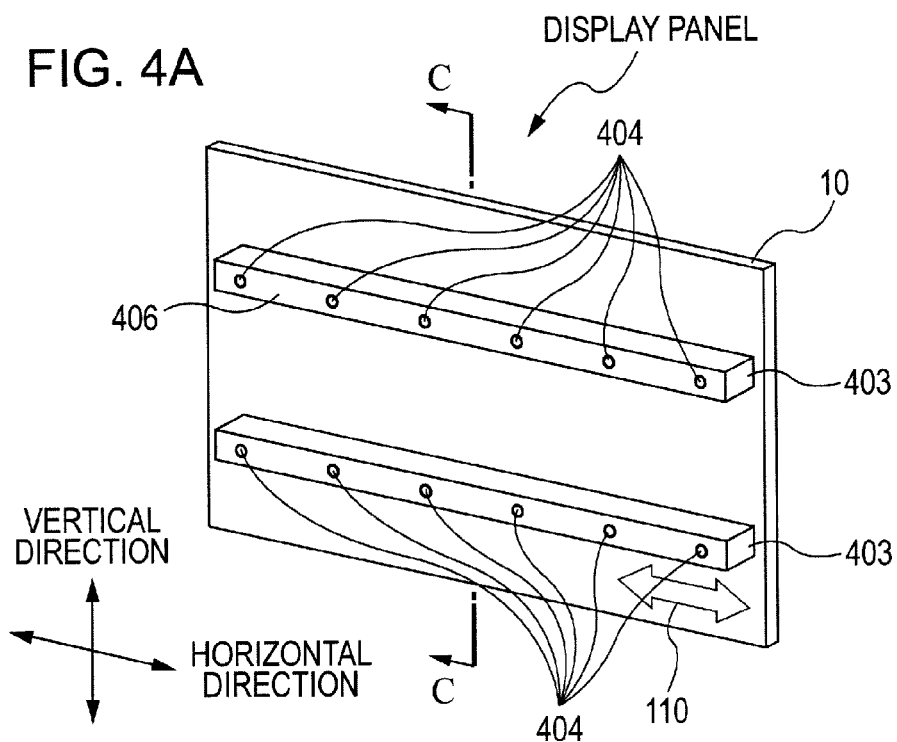
FIGS. 4A and 4B are drawings showing a second variation of fixing members.
Figure 4B:
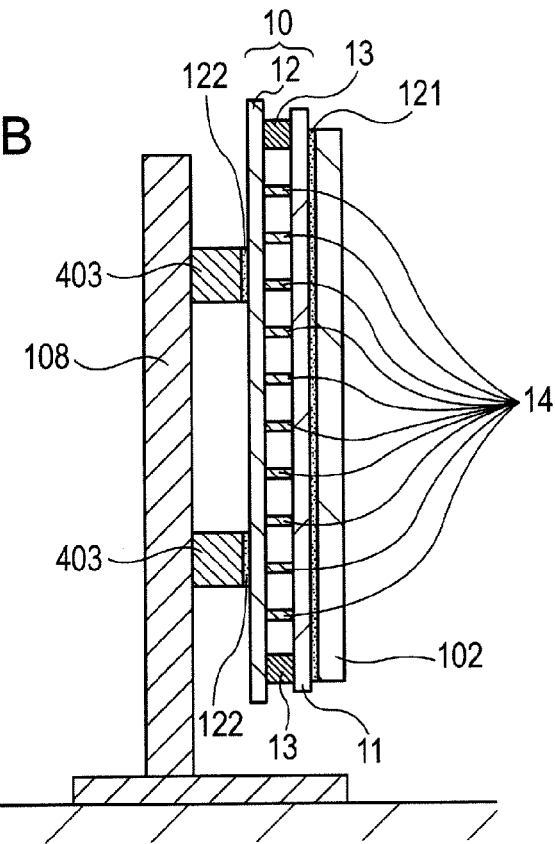

In a second variation as shown in FIG. 4A, fixing members 403 can be composed by thread cutting by using rod-like members 406 as supporting points 404. Thread cutting can be carried out on the rod-like members 406 by direct tapping or helisert processing. FIG. 4A is a perspective view of the back side of a display panel. FIG. 4B is a cross-sectional schematic diagram of an image display apparatus using the vacuum vessel 10 of FIG. 4A in a cross-section corresponding line C-C of FIG. 4A. Other aspects are the same as in the example explained using FIGS. 1 and 2. As a result of employing this configuration, although the degree of freedom with respect to mounting printed circuit boards is inferior as compared with the example of FIGS. 1 and 2, since the fixing members can be formed from a single part, cost reduction effects can be obtained for the fixing members.

Figure 5A:
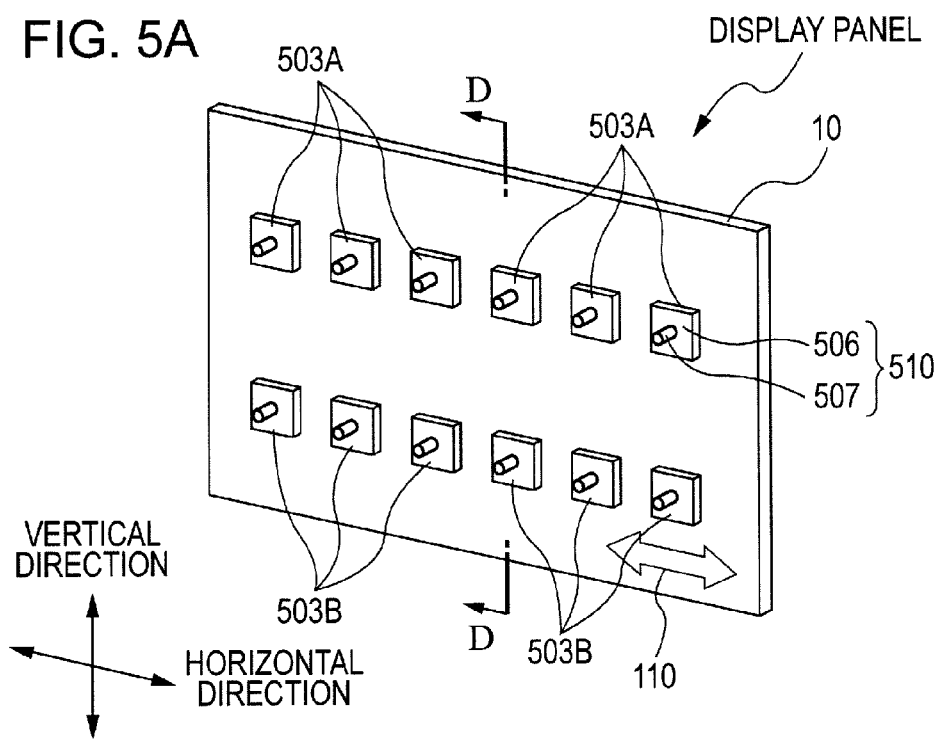
FIGS. 5A and 5B are drawings showing a third variation of fixing members.

In a third variation as shown in FIG. 5A, two fixing members (503A and 503B) can be composed by linearly arranging a large number of units 510 composed of plate-like members 506 and protruding portions 507. Each of the units 510 is provided with a plate-like member 506 and a protruding portion 507 fixed thereon. A plurality of the units 510 are adhered and fixed to the back of the vacuum vessel 10 so as to be mutually separated by a prescribed distance along the lengthwise direction 110 of the plate-like spacers 14 and so that a plurality thereof are arranged in the form of a line. Other aspects of this variation are the same as in the example explained using FIGS. 1 and 2. This third variation is equivalent to a configuration in which the narrow portions 208 that compose the fixing members 103 shown in FIGS. 1 and 2 have been removed (configuration in which wide portions and narrow portions are not connected).

Deformation of the spacers 14 within the vacuum vessel 10 and shear stress generated in those portions contacting the spacers 14 (spacer contact layers 40) can be reduced in the above-mentioned variations as well. The fixing members according to the present invention are substantially not provided with the conventional function as members for reinforcing the vacuum vessel in the manner of a reinforcement frame provided on the back of the vacuum vessel. The front plate 102 fulfills that role with respect to rigidity of the vacuum vessel 10, and particularly with respect to torsional rigidity in the planar direction. Consequently, a member in the manner of a complex and heavy reinforcement frame conventionally provided on the back of the vacuum vessel 10 is no longer required by the display panel or image display apparatus according to the present invention.

(Openings in Bonding Members)

Figure 8A:
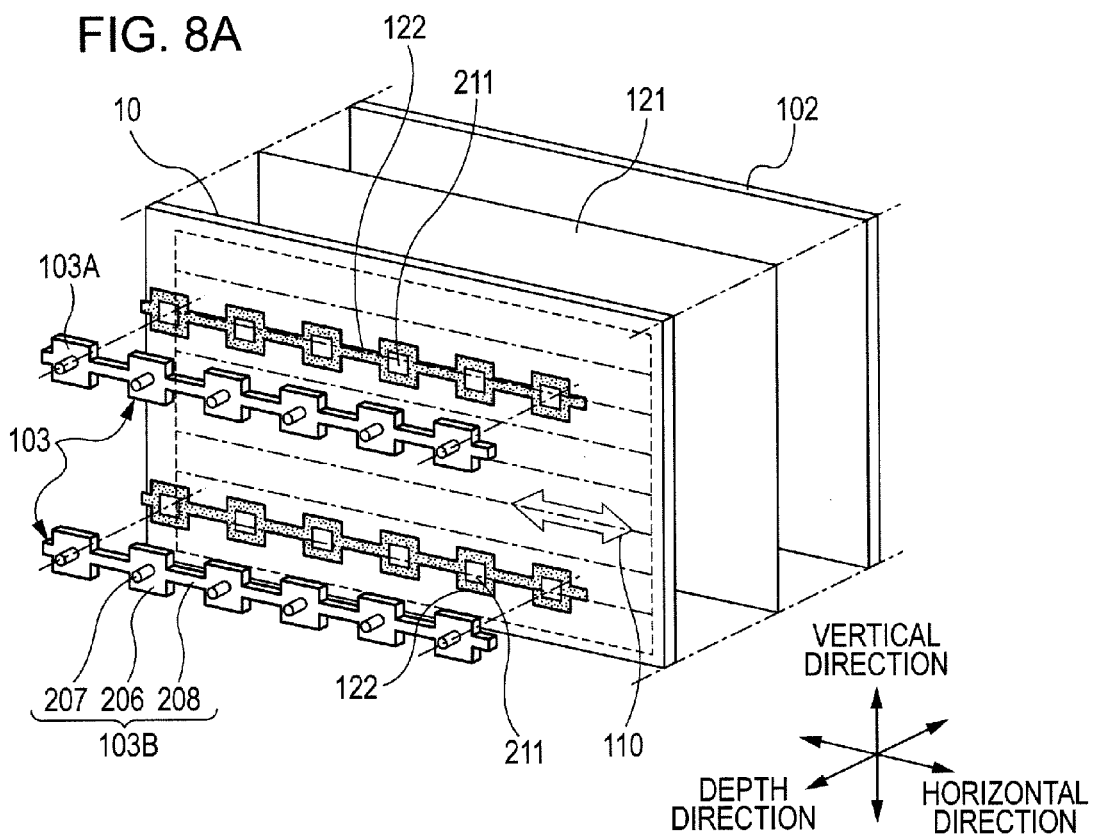
FIGS. 8A and 8B are drawings showing a variation of bonding members.
Figure 8B:
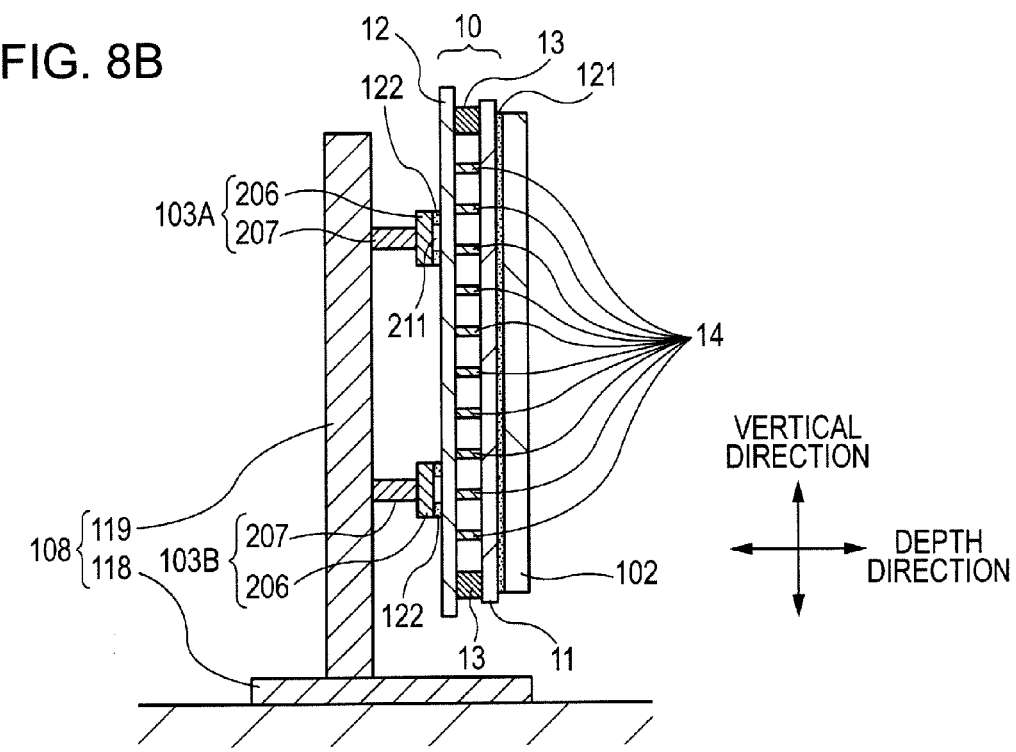

The bonding members 122 are preferably provided with hollow portions 211 as shown in FIGS. 8A and 8B in order to reduce concentration of stress generated in the vacuum vessel 10 when an impact such as dropping is applied to the fixing members 103. Furthermore, the hollow portions 211 can also be referred to as openings 211. The hollow portions (openings) 211 are arranged between the fixing members 103 and the surface of the vacuum vessel 10 (surface of the rear plate 12). In particular, the hollow portions (openings) 211 are preferably arranged between the protruding portions 207 that compose the fixing members 103 and the surface of the vacuum vessel 10 (surface of the rear plate 12). Namely, the hollow portions (openings) 211 are preferably provided directly beneath the protruding portions 207.

In addition, the surface area of the opening is preferably equal to or greater than the external surface area of the protruding portions 207. Furthermore, if the protruding portions 207 are assumed to be in the form of cylindrical columns having a radius r, then the external surface area thereof is defined as $\pi r^2$. In other words, the external surface area of the protruding portions 207 can be considered to be the surface area of an image of the protruding portions 207 orthogonally projected onto the plate-like members (shadow vertically projected onto the plate-like members) that compose the fixing members 103 (and more specifically, the wide portions 206).

Figure 9:
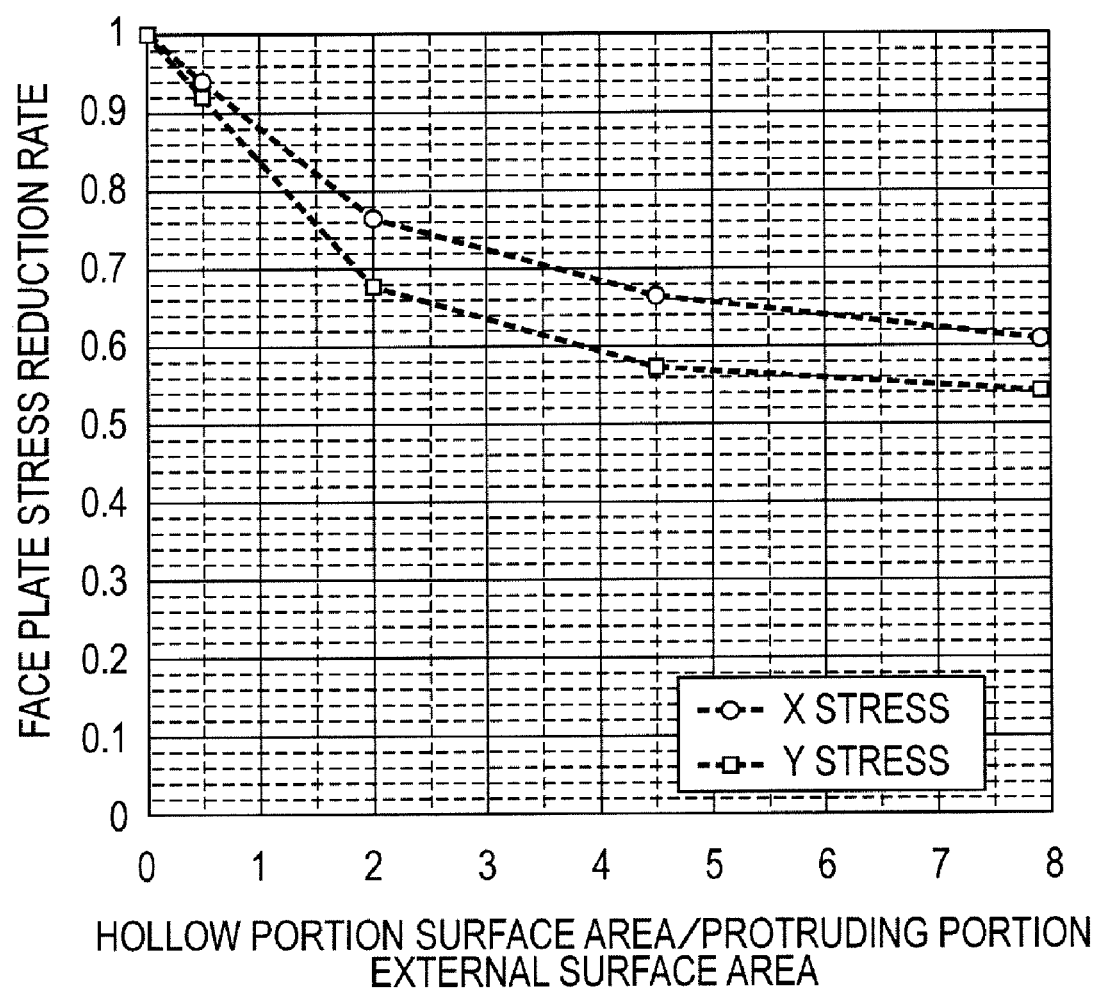
FIG. 9 is a graph showing stress generated in a face plate.

FIG. 9 is a graph indicating the relationship between stress generated in the vacuum vessel 10 when an impact has been applied to a certain protruding portion 207 from the outside and the ratio of the surface area of the hollow portions 211 of the bonding members 122 to the external surface area of the protruding portions 207. In FIG. 9, the horizontal axis indicates the ratio of external surface area to the hollow portions 211, while the vertical axis indicates the stress generated in the face plate 11 of the vacuum vessel 10 located above the protruding portions 207 to which an impact has been applied. Here, the terms "X stress" and "Y stress" in the graph respectively refer to stress acting in the horizontal direction (X direction) and stress acting in the vertical direction (Y direction) shown in FIG. 8A. As shown in FIG. 9, by making the value on the horizontal axis one or more, namely by making the surface area of the hollow portions 211 to be equal to or greater than the external surface area of the protruding portions 207, generated stress can be reduced by 10% or more as compared with the case of not providing the hollow portions 211 (value of 0 on the horizontal axis). In addition, stress can be seen to be further reduced by making the surface area of the hollow portions 211 greater than the external surface area of the protruding portions 207.

Figure 10A:
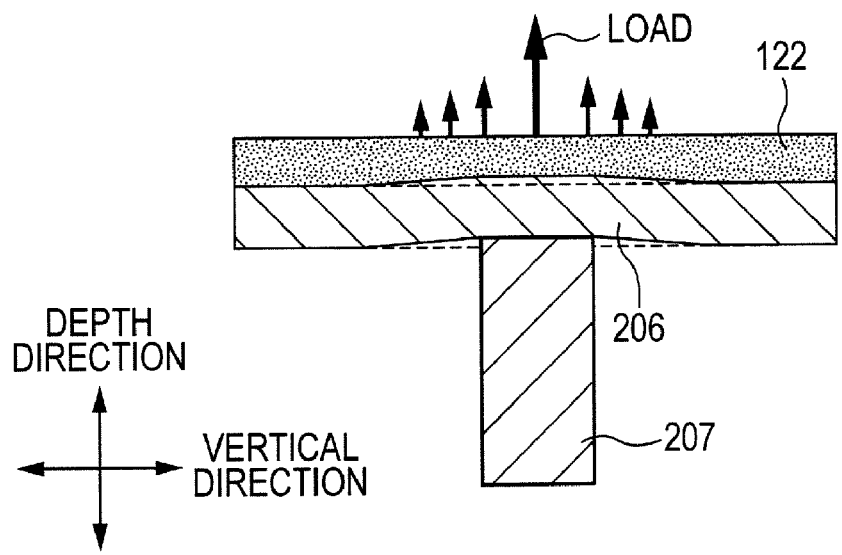
FIGS. 10A and 10B are schematic drawings showing deformation of a fixing member when an impact is applied.
Figure 10B:
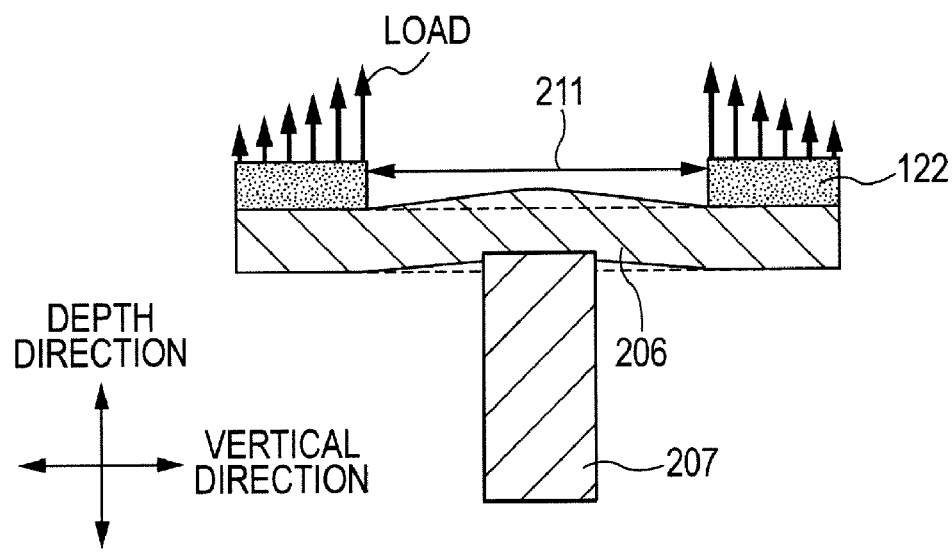

An explanation of this effect of reducing stress is provided below using the schematic diagrams of FIGS. 10A and 10B. FIGS. 10A and 10B are equivalent to partial cross-sectional schematic diagrams taken along the vertical direction of the fixing members 103 and the bonding members 122 provided with the plate-like members (and more specifically, the wide portions 206) and the protruding portions 207. In the case of providing bonding members 210 on all of the backs of the plate-like members (surface on the side of the vacuum vessel 10) (equivalent to a value of zero on the horizontal axis in FIG. 10), impact applied to the protruding portions 207 concentrate directly beneath the protruding portions 207 as schematically shown in FIG. 10A, and the impact is then transmitted to the vacuum vessel 10. On the other hand, by providing the hollow portions 211 having a larger surface area than the external surface area of the protruding portions on the bonding members 122 directly beneath the protruding portions 207, constraining force in the direction (depth direction) perpendicular to the surface of the plate-like members (and more specifically, the wide portions 206) weakens. Consequently, when an impact is applied to the protruding portions 207, the effect can be obtained by which the plate-like members bend in the depth direction, thereby making it possible to disperse the impact that is transmitted to the vacuum vessel 10. As a result, stress generated in the display panel can be reduced. Thus, the occurrence of discharge as previously described can be inhibited, thereby allowing the obtaining of stable and favorable display images. Furthermore, a similar effect can be obtained in the case of the fixing members indicated in FIGS. 3A and 5A as well by providing the hollow portions 211 in the bonding members 122.

Figure 11A:
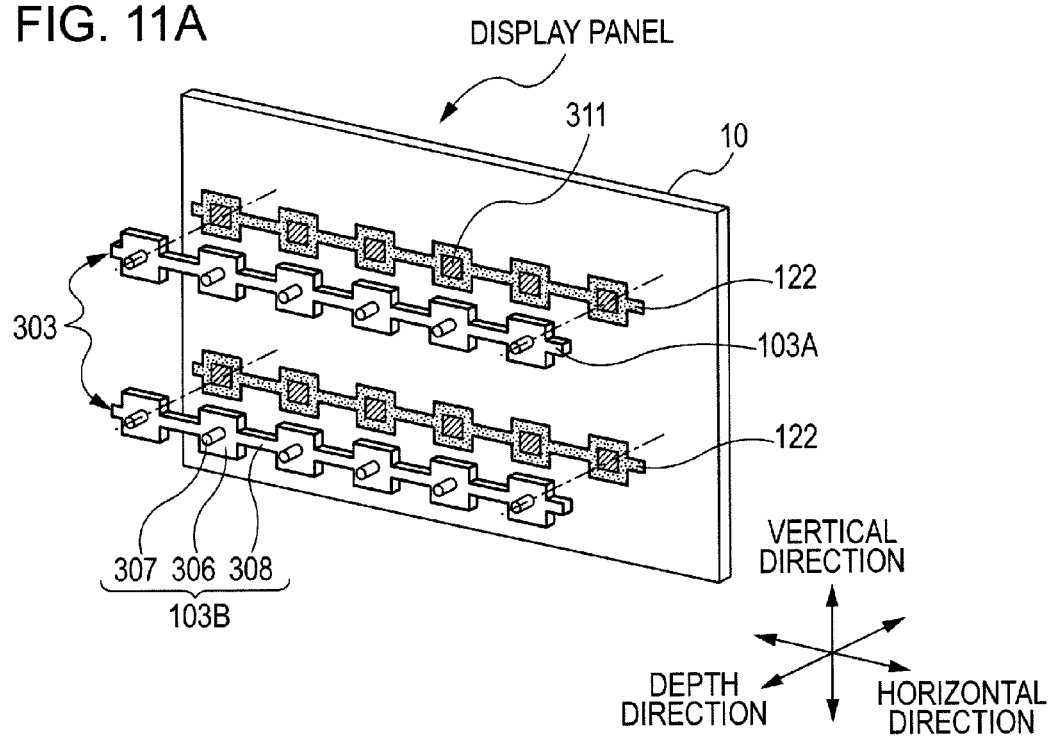
FIGS. 11A and 11B are drawings showing a variation of bonding members.
Figure 11B:
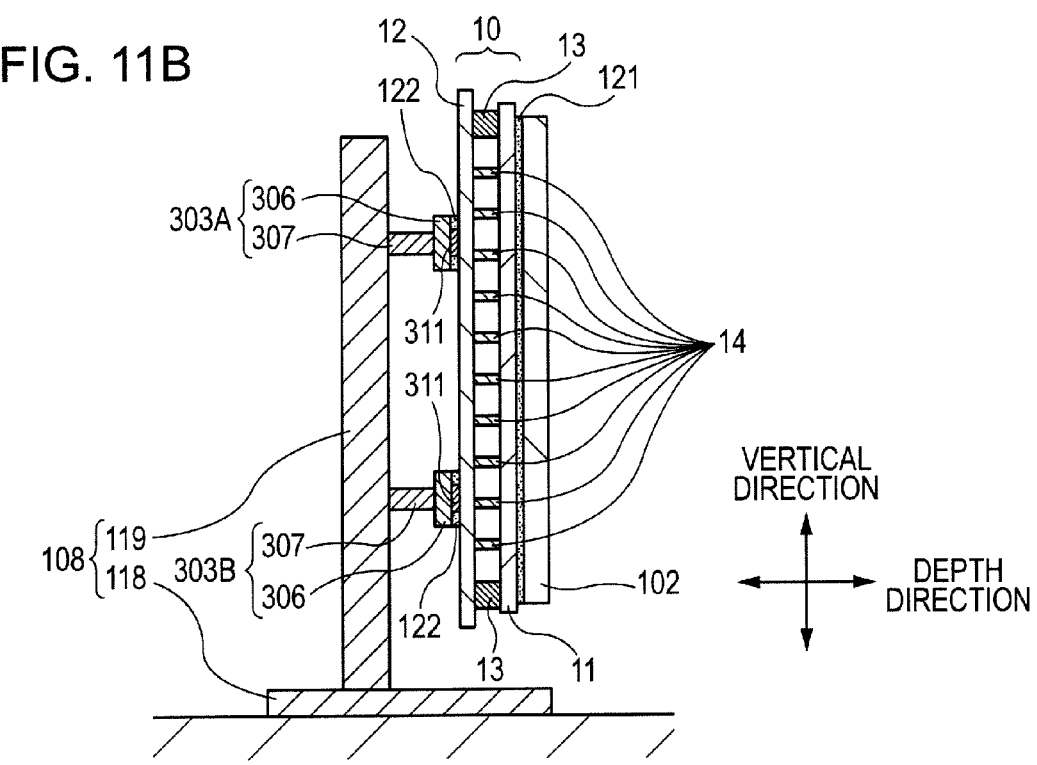

Next, an explanation is provided of a variation of the bonding members 122 using FIGS. 11A and 11B. FIG. 11A is an exploded view of the display panel as viewed from the back side in the same manner as FIG. 8A. FIG. 11B is a cross-sectional schematic drawing of the image display device taken along the vertical direction in the same manner as FIG. 8B. An example of providing the hollow portions (openings) 211 in the bonding members 122 was explained in FIGS. 8A and 8B. However, as shown in FIGS. 11A and 11B, members 311 composed of a material different from that of the bonding members 122 can also be provided in the openings 211. In this case, the material of the members 311 preferably has a lower Young's modulus than that of the bonding members 122. Although the members 311 can be provided so as to fill each of the openings 211, in addition to a form in which they fill each of the openings 211, a form can also be employed in which the members 311 have a space in the manner of an air bubble in a portion thereof. In addition, a form can also be employed in which only a portion of the openings 211 are filled by the members 311. In addition, the members 311 also preferably have the function of bonding members that adhere fixing members 303, provided with protruding portions 307, wide portions 306 and narrow portions 308, to the display panel 10 in terms of realizing stable immobilization of the bonding members 303. More practically, the members 311 are preferably provided with a Young's modulus that is equal to or less than one-tenth the Young's modulus of the bonding members 122. Furthermore, a similar effect can also be obtained in the case of the fixing members shown in FIGS. 3A and 5A by providing the hollow portions (openings) 211 in the bonding members 122 and arranging the members 311 within the hollow portions (openings) 211.

EXAMPLES

The following provides an explanation of specific examples.

First, an explanation is provided of those matters common to the image display apparatuses as claimed in the following Examples 1 and 2. In Examples 1 and 2, the front plate 102 is adhered to and immobilized on the surface (surface on the side open to air) of the faceplate 11 that composes the vacuum vessel 10 using the bonding members 121. Fixing members (103 or 503) are adhered and fixed to the surface of the rear plate 12 (side open to the atmosphere) that composes the vacuum vessel 10 by means of the bonding members 122. Details of the vacuum vessel 10 are basically the same as those explained using FIGS. 6 and 7. The size of the image display region was 55 inches diagonally. In addition, surface-conduction electron-emitting devices were used for the electron-emitting devices 18. The electron-emitting devices 18 were respectively connected to scanning wiring and signal wiring formed by baking a conductive paste containing silver particles. The thickness of the face plate 11 and the rear plate 12 was 1.8 mm, and the interval between the face plate 11 and the rear plate 12 was 1.6 mm.

The flat, rectangular vacuum vessel 10 is sealed in a vacuum, and the inside thereof is held at a pressure of $1.0 \times 10^{-5}$ Pa. The side wall 13 was composed of glass, and indium was used for the bonding members 23. Joining of the face plate 11 and the rear plate 12 was carried out by pressing the rear plate 12 against the face plate 11 while locally heating the bonding members in a vacuum chamber. In addition, a plurality of long, narrow plate-like spacers 14 have a lengthwise direction 110 in the same direction as the lengthwise direction of the flat, rectangular vacuum vessel 10 ("first direction X" or "horizontal direction"). The plurality of long, narrow plate-like spacers 14 are arranged at 15 mm intervals in the direction perpendicular to the lengthwise direction of the vacuum vessel 10 ("second direction Y" or "vertical direction"). The spacers 14 were composed of glass and the thickness thereof was made to be 200 µm. The spacers 14 were provided on scanning wiring, and both ends in the lengthwise direction thereof were fixed to the rear plate 12 with an inorganic adhesive (Aron Ceramic D, Toagosei Co., Ltd.). In addition, the lengthwise direction of the front plate 102, the lengthwise direction of the vacuum vessel 10 and the lengthwise direction 110 of the plate-like spacers 14 were arranged to be parallel. In addition, the front plate 102 is composed of the same glass plate as the face plate 11 and the rear plate 12, and has an image display area larger than that of the vacuum vessel 10. The thickness of the front plate 102 was made to be 2.5 mm in the examples. Although that size is the same as that of the face plate 11, in the case of glass, the thickness is within the range of 1.5 to 3.5 mm. An acrylic UV-curable resin adhesive was used for the bonding members 121. More specifically, TB3042C (ThreeBond Co., Ltd.) was used for the bonding members 121 in the examples. An acrylic UV-curable resin adhesive was coated over the entire surface of the side of the front plate 102 opposing the face plate 11, and although the thickness thereof was made to be 0.5 mm, in terms of practical use, the thickness is within the range of 0.1 to 1 mm. The silicone resin adhesive used had a Young's modulus of 1 to 5 MPa and breaking elongation of 100% or more. An advantage of combining the front plate 102 and the bonding members 121 in this manner is that reflection of external light and reflection of displayed images can be prevented in an image display apparatus.

Although adhesive or double-sided adhesive tape can be considered for use as the bonding members 122, a silicone-based, elastic resin adhesive can be used as an adhesive, while double-sided adhesive tape having an acrylic base can be used as double-sided adhesive tape. A silicone-based elastic resin adhesive in the form of TSE3944 (Momentive Performance Materials Japan LLC) was used for the silicone-based elastic resin adhesive in the examples. The silicone resin adhesive was coated over the entire surface of the side of the fixing members 102 opposing the rear plate 12, and although it was applied at a thickness of 1 mm, in terms of practical use, it may be applied at a thickness within the range of 0.1 to 2 mm.

Example 1

The fixing member 103 used in the present example was provided with the configuration shown in FIG. 2. FIG. 2A is a perspective view of the back side of a display panel of the present example. FIG. 2B is a cross-sectional schematic diagram of the image display apparatus using the vacuum vessel 10 of FIG. 2A in a cross-sectional corresponding to line A-A of FIG. 2A. The fixing member 103 used in this example is provided with the configuration shown in FIGS. 1 and 2. Two linear fixing members (103A and 103B) were adhered at mutual intervals to the back side of the rear plate 12 that composes the vacuum vessel 10 by the bonding members 122. Each of the fixing members (103A and 103B) are formed from plate-like members 206, which are composed by being alternately provided with a plurality of wide portions 206 and a plurality of narrow portions 208, and a plurality of protruding portions 207 fastened on each of the wide portions 206. The plate-like members 206 were formed by press forming. The protruding portions 207 were subjected to thread cutting to give them the function of supporting points for supporting the vacuum vessel 10 by fixing the vacuum vessel 10 to the supporting member 108. In the present example, the protruding portions 207 were formed by header processing. The plate-like members 206 and the protruding portions 207 were fixed by carrying out knurling processing and groove processing on the protruding portions 207 at those locations that contact the plate-like members 206 followed by carrying out indentation caulking from the back side.

The shape of the plate-like members 206 was such that the wide portions measured 60 mm high×60 mm across, while the narrow portions measured 10 mm high×140 mm across. In addition, the thickness of the plate-like members 206 was 2 mm. Here, although the thickness was set to 2 mm, if metal or an alloy is used for the material, the thickness in terms of practical use is preferably 1 mm or more to less than 30 mm and more preferably less than 10 mm. In addition, zinc-plated sheet steel was used for the material of the plate-like members 206. In addition, a single protruding portion 207 was fixed in the center of a single wide portion 206. Furthermore, the height of the top of the protruding portions 207 (portion at the greatest distance from the back side of the rear plate 12) from the back side of the rear plate 12 was 25 mm. In terms of practical use, the height of the protruding portions 207 from the back side of the rear plate 12 is 5 mm or more to less than 30 mm in consideration of the arrangement of circuit boards and the like. Stainless steel was used for the material of the protruding portions 207. In addition, the pitch in the horizontal direction of the protruding portions 207 (supporting points) was 200 mm. Two fixing members (103A and 103B) were provided at an interval on the back side of the vacuum vessel 10 (side of the rear plate 12 exposed to the atmosphere). The supporting member 108 is fixed to the fixing members by fastening with screws. Furthermore, although two fixing members (103A and 103B) were used in the present example, the number of fixing members can be two or more. In addition, although the pitch in the vertical direction of the protruding portions 207 (supporting points) was 420 mm in the present example, in terms of practical use, it is within the range of 400 to 430 mm. The locations of the fixing members 103 relative to the vacuum vessel 10 is such that one of the fixing members 103A satisfies a linear symmetrical relationship with respect to the other fixing member 103B having the center line 144 in the horizontal direction (lengthwise direction 110 of the plate-like spacers 14) of the image display region (or rear plate 12) of the vacuum vessel 10 as the axis of symmetry. In addition, each of the fixing members (103A and 103B) was arranged so as to have a linearly symmetrical relationship having the center line 143 in the vertical direction of the image display region (or rear plate 12) as the axis of symmetry (state such that the image display region can be folded back in the vertical direction at the center line 143). The protruding portions 207 were in the form of cylindrical columns having a diameter of 16 mm. Furthermore, the shape of the protruding portions 207 may also be a tetragonal column or polygonal column instead of a circular column. These dimensions can be varied according to the rigidity of the vacuum vessel 10, rigidity of the front plate 102, mechanical properties of the bonding member 121, mechanical properties of the bonding members 122, and rigidity of the plurality of fixing members 103, and proper values can be derived for these values.

A vertical drop test from a height of 20 cm and a vibration test were carried out in order to confirm the effect of the vacuum vessel 10, in which the front plate 102 was adhered by the bonding members 121, being supported by the supporting member 108 by means of the plurality of fixing members 103. Furthermore, at that time, testing was carried out so that impact and vibrations acted directly on the supporting member 108 (so that impact and vibrations acted on the vacuum vessel 10 through the supporting member 108 (fixing members 103)). As a result, there were no cracks in the vacuum vessel 10, and stress was confirmed to be generated that was lower than the cracking stress of the vacuum vessel 10. In addition, stress generated in the vacuum vessel 10 was able to be reduced by increasing the number of the protruding portions 207 serving as supporting points. In addition, discharge phenomena were unable to be confirmed when an image was displayed with the image display apparatus following the above-mentioned vertical drop test, and stable display images were able to be obtained over a long period of time. In addition, when the vacuum vessel 10 was disassembled, there was no damage to the spacers 14, and signs of crushing of the metal back 20 or spacer contact layer 40 by the spacers 14 were not observed.

In addition, the surface for mounting printed circuit boards was able to be made flat by employing the above-mentioned form for the plurality of the fixing members 103, and electrical circuits were able to be arranged at preferable locations without having to give hardly any consideration to the location of a reinforcement frame as in the prior art between the supporting member 108 and the rear plate 12. Consequently, design restrictions on electrical circuits were able to be reduced. An example of a design restriction is avoiding interference with the protruding portions 207. However, design restrictions were able to be diminished by drilling holes in a portion of a printed circuit board or plate to which a printed circuit board is fixed corresponding to the shape of the protruding portions 207, or by arranging printed circuit boards at locations where the protruding portions 207 were not present. In addition, effects resulting in considerable reductions in weight and costs of the display panel were able to be obtained in comparison with a reinforcement frame or other type of supporting member that was required in the prior art to obtain the same degree of strength for the display panel.

Furthermore, in a comparative example, two of the fixing members and bonding members 122 of the present Example 1 were rotated 90° (arranging so as be aligned in the vertical direction), and provided on the back of the rear plate 12 that composes the vacuum vessel 10. When a vertical drop test was carried out in the same manner as Example 1, a portion of the spacer contact layers 40 were confirmed to have been crushed by the spacers 14. In addition, damage to a portion of the spacers was also confirmed. Furthermore, the vertical direction refers to the direction perpendicular to the lengthwise direction 110 of the plate-like spacers 14.

Example 2

Figure 5B:
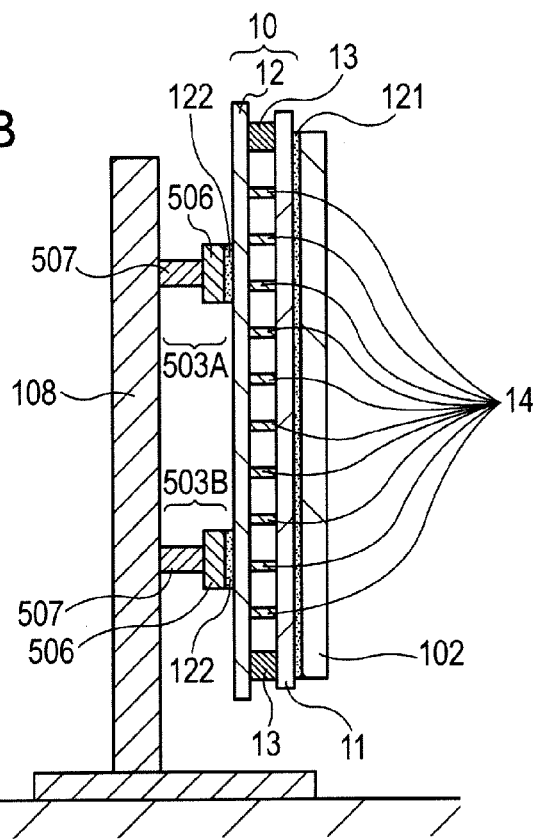

Two fixing members (503A and 503B) used in the present example are provided with the configuration shown in FIG. 5. The following provides an explanation of only those aspects of Example 2 that differ from Example 1. FIG. 5A is a perspective view of the backside of the vacuum vessel 10 in the present example. FIG. 5B is a cross-sectional schematic diagram of an image display apparatus using the vacuum vessel 10 of FIG. 5A in a cross-section corresponding to the line D-D of FIG. 5A. A plurality of units 510 each composed from plate-like members 506 and protruding portions 507 compose two fixing members (503A and 503B) by being arranged in two rows.

The present example is equivalent to a configuration in which the narrow portions 208 have been omitted (configuration in which wide portions and narrow portions are not connected) in comparison with Example 1. Thus, the plate-like members 506 in the present example are equivalent to the wide portions 206 in Example 1, and the plate-like members 506 measure 60 mm high×60 mm across. The protruding portions 507 in the present example are equivalent to the protruding portions 207 in Example 1. The units 510 are composed by fixing a single protruding portion 507 in the center of each plate-like member 506. In the present example, a single fixing member 503 was composed by arranging six units 510 in a row in the horizontal direction (lengthwise direction 110 of the spacers 14) such that the pitch in the horizontal direction of the protruding portions 507 was 150 mm. Two fixing members 503 are adhered by the bonding members 122 on the back side (side of the rear plate 12 exposed to the atmosphere) of the vacuum vessel 10 so as to be separated in the vertical direction (direction perpendicular to the lengthwise direction 110 of the spacers 14). Furthermore, each unit was adhered so that the pitch in the vertical direction of the protruding portions 507 (supporting points) that compose each unit was 420 mm. Furthermore, although the number of the units 510 that compose a single fixing member (503A or 503B) is not limited to six, the numbers of the units 510 that compose each row are preferably equal.

The plate-like members 506 that compose the fixing members (503A, 503B) (the wide portions 206 in Example 1) and the protruding portions 507 (the protruding portions 207 in Example 1) are formed in the same manner as Example 1. In addition, the shape, supporting point pitch and methods of fixing the plate-like members 506 and protruding portions 507 were the same as in Example 1. When a vertical drop test was carried out in the same manner as Example 1, there were no signs of damage to the spacers or crushing of the metal back 20 or spacer contact layer 40 observed in this example as well.

As a result of configuring the fixing members in the manner of the present example, the narrow portions 208 of Example 1 can be omitted, thereby further obtaining the effects of reducing the weight and cost of the display panel.

As has been described above, according to the present invention, deformation of the spacers and shear stress of spacer contact portions can be reduced and destruction of the vacuum vessel can be prevented even in cases in which strong impact such as a dropping impact is applied to the image display apparatus. In addition, reduced thickness, light weight and lower costs of the image display apparatus can be realized.

Example 3

Example 3 is provided with a configuration in which the hollow portions 211 are provided in the bonding members 122 of Example 1. Other constituent members are the same as those of Example 1.

The bonding members 122 are 60 mm high×60 mm across directly beneath the wide portions 206 and 10 mm high×140 mm across directly beneath the narrow portions 208 so as to have the same shape as the fixing members 103. In addition, the hollow portions 211 are 40 mm high×40 mm across so as to have a shape that is equal or greater than the external surface area of the protruding portions 207. Namely, directly beneath the wide portions 206, the bonding members 122 have a ring shape having a width of 10 mm, measuring 60 mm high×60 mm across, and having a thickness of 0.5 mm. As a result of employing this shape, stress in the face plate 11 of the vacuum vessel 10 was confirmed to be reduced by 40%. Furthermore, the shape of the hollow portions 211 is not limited to a tetragon, but rather may be that of a circle or polygon. These dimensions vary according to the rigidity and weight of the vacuum vessel 10, rigidity and weight of the front plate 102, mechanical properties of the bonding members 121, mechanical properties of the bonding members 122, and rigidity of the plurality of fixing members 103, and proper values can be derived for these values. When a vertical drop test was carried out in the same manner as Example 1, there were no signs of damage to the spacers or crushing of the metal back 20 and spacer contact layer 40 observed in this example as well.

Example 4

The configuration of the bonding members 122 in Example 4 differs from that of Example 3. The following provides an explanation of only those aspects of Example 4 that differ from Example 3. In the bonding members 122 of this example, as shown in FIGS. 11A and 11B, bonding members 311 having different mechanical properties than the bonding members 122 of Example 3 are filled into the hollow portions 211 of the bonding members 122 of Example 3. Here, mechanical properties specifically refer to Young's modulus, with the Young's modulus of the bonding members 311 being 1 MPa and the Young's modulus of the bonding members 122 being 10 MPa. In addition, the bonding members 311 have a square shape measuring 40 mm high×40 mm across that has a surface area equal to or greater than the external surface area of protruding portions 307. Furthermore, the shape of the bonding members 311 is not limited to a tetragon, but rather may also be a circle or polygon. In addition, the thickness of the bonding members 122 and the bonding members 311 was made to be 0.5 mm.

The plate-like members (306, 308) and the protruding portions 307 that compose the fixing members (303A, 303B) are formed in the same manner as the plate-like members (206, 208) and the protruding portions 207 of Example 1. In addition, their shape, pitch between protruding portions, and method of fixing the plate-like members and the protruding portions 307 were made to be the same as in Example 1. When a vertical drop test was carried out in the same manner as Example 1, there were no signs of damage to the spacers or crushing of the metal back 20 and spacer contact layer 40 observed in this example as well in the same manner as Example 1.

Example 5

Figure 12:
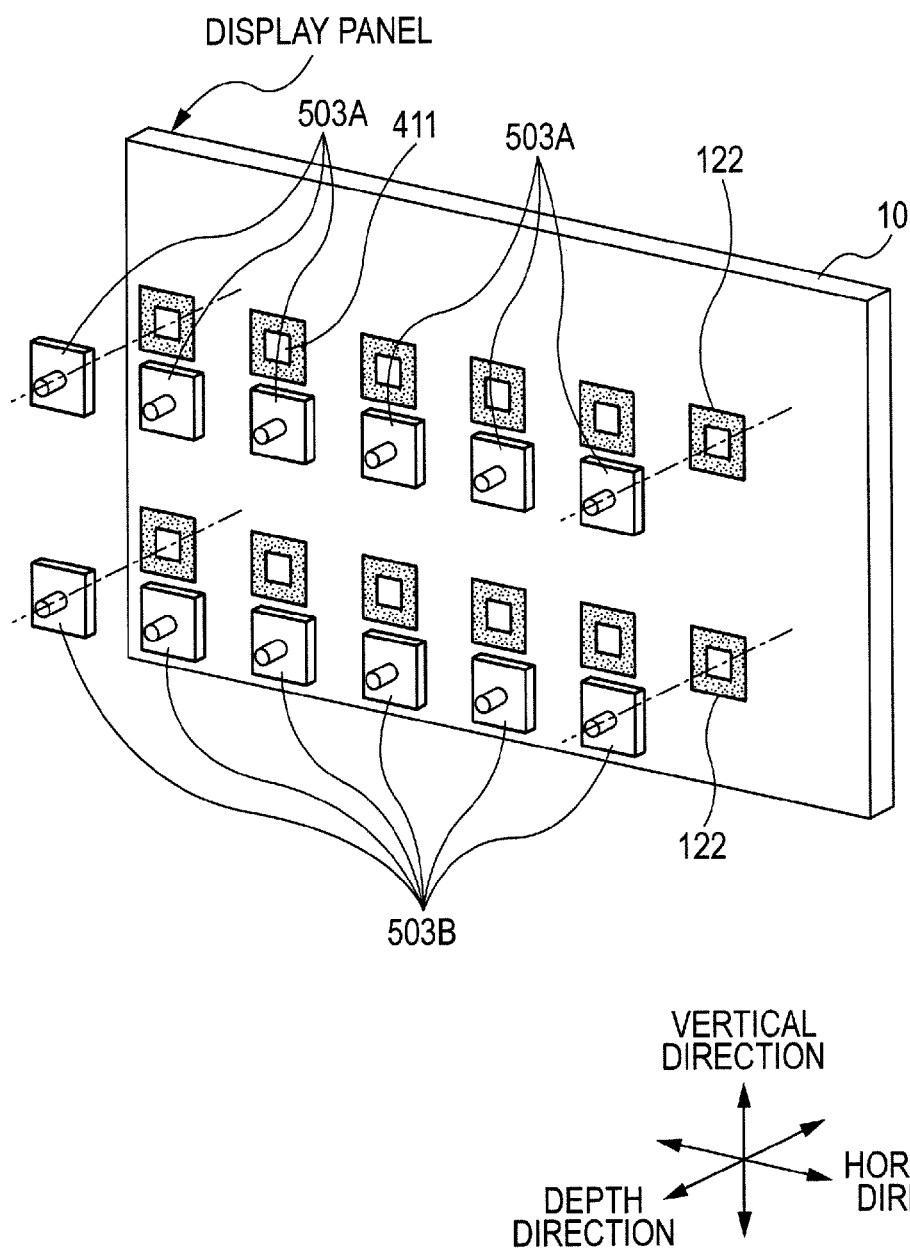
FIG. 12 is a drawing showing a variation of a bonding member.

FIG. 12 shows fixing members (503A, 503B) and bonding members 112 of Example 5. This example employs a configuration in which the hollow portions 211 are provided in the bonding members 112 of Example 2. Furthermore, the shape and surface area of the hollow portions 211 were set in the same manner as Example 3. When a vertical drop test was carried out in the same manner as Example 1, there were no signs of damage to the spacers or crushing of the metal back 20 and spacer contact layer 40 observed in this example as well in the same manner as Example 1.

An image display apparatus comprising: a vacuum vessel provided with a face plate to which is adhered a front plate, a rear plate having a surface that opposes the face plate, and a plurality of plate-like spacers provided between the face plate and the rear plate so that the lengthwise directions thereof are parallel to each other; a plurality of linear fixing members adhered to a surface of the rear plate on the opposite side from the surface opposing the face plate; and a supporting member that supports the vacuum vessel by means of the fixing members, wherein each of the plurality of linear fixing members is adhered to the rear plate by bonding members at mutually prescribed intervals and along the lengthwise direction of the plurality of spacers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-118970, filed on May 15, 2009, and Japanese Patent Application No. 2009-272574, filed on Nov. 30, 2009, which are hereby incorporated by reference herein in their entirety.

What is claimed is:

1. A vacuum vessel, comprising:
a face plate;
a rear plate having an interior surface that opposes the face plate;
a side wall joining the face plate and the rear plate;
a plurality of plate-like spacers provided between the face plate and the rear plate so that lengthwise directions thereof are parallel to each other;
a plurality of linear fixing members adhered to an exterior surface of the rear plate on the opposite side from the interior surface at mutually prescribed intervals and along the lengthwise direction of the plurality of spacers; and
bonding members provided between the fixing members and the exterior surface of the rear plate, with the bonding members extending in the same linear direction as the fixing members.

2. The vacuum vessel according to claim 1 wherein each of the plurality of fixing members is provided with a plate-like member adhered to the exterior surface and a plurality of protruding portions.

3. The vacuum vessel according to claim 2, wherein the plate-like member is provided with a plurality of alternating wide portions and narrow portions provided along the lengthwise direction of the plurality of spacers, and the plurality of protruding portions are provided on the wide portions.

4. The vacuum vessel according to claim 3, wherein the wide portions and the narrow portions are connected.

5. The vacuum vessel according to claim 2, wherein the bonding members are each provided with an opening between the plate-like member and the rear plate.

6. The vacuum vessel according to claim 5, wherein the opening is located directly beneath each of the protruding portions.

7. The vacuum vessel according to claim 6, wherein a material having a lower Young's modulus than the bonding members is arranged inside the opening.

8. The vacuum vessel according to claim 1, wherein the bonding members have the same shape as the fixing members.

9. The vacuum vessel according to claim 8, wherein the bonding members have an adhesive surface with the same shape as the fixing members.

10. A display panel, comprising:
a vacuum vessel provided with a face plate, a rear plate having an interior surface that opposes the face plate, and a side wall joining the face plate and the rear plate;
a plurality of spacers provided between the face plate and the rear plate so that lengthwise directions thereof are parallel to each other;

an image display unit configured to display an image, the image display unit including an electron-emitting unit provided within the vacuum vessel;

a plurality of linear fixing members adhered to an exterior surface of the rear plate on the opposite side from the interior surface at mutually prescribed intervals and along the lengthwise direction of the plurality of spacers; and bonding members provided between the fixing members and the exterior surface of the rear plate, with the bonding members extending in the same linear direction as the fixing members.

11. The display panel according to claim 10, wherein
each of the plurality of fixing members is provided with a plate-like member adhered to the exterior surface and a plurality of protruding portions.

12. The display panel according to claim 11, wherein
the plate-like member is provided with a plurality of alternating wide portions and narrow portions provided along the lengthwise direction of the plurality of spacers, and the plurality of protruding portions are provided on the wide portions.

13. The display panel according to claim 12, wherein
the wide portions and the narrow portions are connected.

14. The display panel according to claim 11, wherein the bonding members are each provided with an opening between the plate-like member and the rear plate.

15. The display panel according to claim 14, wherein
the opening is located directly beneath each of the protruding portions.

16. The display panel according to claim 10, wherein the bonding members have the same shape as the fixing members.

17. The display panel according to claim 16, wherein the bonding members have an adhesive surface with the same shape as the fixing members.

18. An image display apparatus, comprising:
a vacuum vessel provided with a face plate, a rear plate having an interior surface that opposes the face plate, and a side wall joining the face plate and the rear plate;
a plurality of spacers provided between the face plate and the rear plate so that lengthwise directions thereof are parallel to each other;
an image display unit configured to display an image, the image display unit including an electron-emitting unit provided within the vacuum vessel;
a plurality of linear fixing members adhered to an exterior surface of the rear plate on the opposite side from the interior surface at mutually prescribed intervals and along the lengthwise direction of the plurality of spacers; and
bonding members provided between the fixing members and the exterior surface of the rear plate, with the bonding members extending in the same linear direction as the fixing members; and
a supporting member to support the display panel, with the supporting member fixed to the fixing members.

19. The display panel according to claim 18, wherein
each of the plurality of fixing members is provided with a plate-like member adhered to the exterior surface and a plurality of protruding portions.

20. The display panel according to claim 19, wherein
the plate-like member is provided with a plurality of alternating wide portions and narrow portions provided along the lengthwise direction of the plurality of spacers, and the plurality of protruding portions are provided on the wide portions.

21. The display panel according to claim 20, wherein
the wide portions and the narrow portions are connected.

22. The display panel according to claim 19, wherein the bonding members are each provided with an opening between the plate-like member and the rear plate.

23. The display panel according to claim 22, wherein
the opening is located directly beneath each of the protruding portions.

24. The image display apparatus according to claim 18, wherein the bonding members have the same shape as the fixing members.

25. The image display apparatus according to claim 24, wherein the bonding members have an adhesive surface with the same shape as the fixing members.

* * * * *